(12) United States Patent
Ramu

(10) Patent No.: US 8,319,456 B2
(45) Date of Patent: Nov. 27, 2012

(54) METHOD, CONTROLLER, AND POWER CONVERTER FOR CONTROLLING A SINGLE-SWITCH BASED SWITCHED RELUCTANCE MACHINE

(75) Inventor: Krishnan Ramu, Blacksburg, VA (US)

(73) Assignee: Ramu, Inc., Blacksburg, VA (US)

( * ) Notice: Subject to any disclaimer, the term of this patent is extended or adjusted under 35 U.S.C. 154(b) by 418 days.

(21) Appl. No.: 12/672,690

(22) PCT Filed: Aug. 13, 2008

(86) PCT No.: PCT/US2008/009659
§ 371 (c)(1),
(2), (4) Date: Feb. 9, 2010

(87) PCT Pub. No.: WO2009/023206
PCT Pub. Date: Feb. 19, 2009

(65) Prior Publication Data
US 2011/0193507 A1    Aug. 11, 2011

Related U.S. Application Data

(60) Provisional application No. 60/955,663, filed on Aug. 14, 2007.

(51) Int. Cl.
*H02P 25/08* (2006.01)

(52) U.S. Cl. .................... 318/254.1; 318/701

(58) Field of Classification Search ............... 318/254.1, 318/254.2, 400.13, 400.14, 400.15, 701, 318/714, 715, 720–724
See application file for complete search history.

(56) References Cited

U.S. PATENT DOCUMENTS

| 4,253,053 | A | | 2/1981 | Ray | |
|---|---|---|---|---|---|
| 4,611,157 | A | * | 9/1986 | Miller et al. | 318/696 |
| 5,012,171 | A | * | 4/1991 | Sember | 318/696 |
| 5,789,893 | A | | 8/1998 | Watkins | |
| 6,236,179 | B1 | * | 5/2001 | Lawler et al. | 318/400.34 |
| 6,700,348 | B2 | * | 3/2004 | Lim | 318/778 |
| 7,009,360 | B2 | * | 3/2006 | Jin-woo et al. | 318/254.1 |
| 7,015,615 | B2 | | 3/2006 | Ramu | |
| 7,271,564 | B2 | | 9/2007 | Ramu | |
| 2002/0185990 | A1 | | 12/2002 | Elliott | |
| 2005/0146304 | A1 | | 7/2005 | Ramu | |

OTHER PUBLICATIONS

International Search Report dated Nov. 18, 2008 with Written Opinion.

\* cited by examiner

*Primary Examiner* — Bentsu Ro
(74) *Attorney, Agent, or Firm* — NSIP Law

(57) ABSTRACT

A method for controlling a multi-phase motor includes withholding energization of a first phase of the motor for a non-zero period when the first phase's dwell time begins. Energization of the first phase is activated upon the expiration of the non-zero period. Energization of the first phase is deactivated for the remainder of the dwell time at a deactivation time occurring before or at the expiration of the dwell time.

32 Claims, 16 Drawing Sheets

METHOD, CONTROLLER, AND POWER CONVERTER FOR CONTROLLING A SINGLE-SWITCH BASED SWITCHED RELUCTANCE MACHINE

CROSS-REFERENCE TO RELATED APPLICATIONS

This application claims priority to international application PCT/US2008/009659, filed Aug. 13, 2008, which claims priority to U.S. provisional application 60/955,663, filed Aug. 14, 2007.

FIELD OF THE INVENTION

The disclosure herein relates to the field of switched reluctance machines and, more particularly, to control strategies for controlling multi-phase switched reluctance machines having single-switch based control circuits.

BACKGROUND OF THE RELATED ART

Induction motors and universal motors are currently being used in applications requiring constant speed and low horsepower, mainly because of their competitive cost. To replace such related art motors, research has been conducted on single-phase switched reluctance motors (SRMs) over the last decade. However, prior single-phase SRM machines are not generally suitable for high performance applications due to limitations such as low output power density and only a 50% duty cycle of torque generation. They also require permanent magnets or auxiliary windings for self-starting.

Because of the limitations of single-phase SRMs, there has been more attention paid to multi-phase SRM machines (i.e., having more than one phase), especially for high torque and/or high-efficiency applications. For example, two-phase SRMs may be employed as brushless motor drives in variable-speed applications, such as for home appliances and power tools. Two-phase SRMs are particularly desirable because of their relative simplicity in design and lower costs to manufacture. Various types of two-phase SRMs are described in U.S. Pat. No. 7,015,615, by K. Ramu et al., issued Mar. 21, 2006.

FIGS 1A and 1B illustrate a related art two-phase SRM 100. SRM 100 includes a stator 110 having four stator poles 115 and a rotor 120 having two rotor poles 125. Rotor 120 is adapted to rotate around a fixed shaft 130 connected to the center of rotor 120. Each of a first pair of concentric windings 140, such as copper coils, is disposed on a respective one of diametrically opposite stator poles 115A. Windings 140 may be electrically connected in series or in parallel. Similarly, a second pair of windings 150 is disposed on a respective one of diametrically opposite stator poles 115B. Windings 150 likewise may be connected in series or in parallel. FIG. 1A shows SRM 100 in a first phase. In this first phase, a current is applied through windings 140 and the resulting magnetic force causes rotor poles 125 to align with stator poles 115A. FIG. 1B shows a second phase in which a current through windings 150 causes rotor poles 125 to align with stator poles 115B. By selectively energizing windings 140 and 150, the first and second phases of SRM 100 are activated and the rotational speed of rotor 120 can be controlled.

The phase windings of a multi-phase SRM are typically energized by a control circuit associated with the SRM. As used herein, a phase winding refers to one or more windings, such as used to activate a single phase of an SRM or other brushless machine. For example, in FIGS. 1A and 1B, each set of windings 140 and 150 may constitute a different phase winding in SRM 100. Typically, an SRM control circuit has one or more switches per phase winding, for turning on and off current flow in the winding. For example, each phase winding may be associated with one or more electrical, mechanical, or electro-mechanical switches (such as a relay), including but not limited to various types of transistor switches. Again, with reference to SRM 100 shown in FIGS. 1A and 1B, at least one switch (not shown) may be used to control the current flow through phase winding 140 and at least one different switch (not shown) may control the current flow through phase winding 150. U.S. Pat. No. 7,271,564, by K. Ramu, issued Sep. 18, 2007, at FIGS. 1-4, illustrates various examples of related art multi-switch control circuits for use with multi-phase SRM machines.

One drawback to related art multi-switch SRM control circuits is their cost. That is, each switch in the control circuit is typically associated with additional circuitry for controlling its operation. For example, each switch may be implemented by a transistor switch having associated circuitry for changing the state of the switch and may be further associated with other circuit components, such as diodes, resistors, capacitors, etc. Also, because each switch in the multi-switch circuit may be independently controlled, additional circuitry may be required to implement a switch control strategy. The added circuitry associated with each of the switches tends to significantly increase both the cost and complexity of the SRM control circuit.

To overcome the disadvantages of multi-switch control circuits, single-switch control circuits have been used with multi-phase SRM machines. Single-switch circuits typically require less circuitry, such as fewer transistor switches and diodes, than multi-switch control circuits. As a result, single-switch control circuits can reduce both the cost and complexity of an SRM. Such single-switch circuits also have the advantage that they do not require multiple control strategies for controlling multiple switches. Rather, only one switch is actively controlled to trigger multiple phases of the SRM. Various single-switch SRM control circuits are disclosed in U.S. Pat. No. 7,271,564, by K. Ramu, issued Sep. 18, 2007.

FIG. 2 illustrates a single-switch control circuit 200 that can be used in a two-phase SRM. A similar single-switch control circuit is disclosed in U.S. Pat. No. 7,271,564, by K. Ramu, issued Sep. 18, 2007, for example, in FIG. 10. Control circuit 200 includes a direct current (DC) power source 210 and control circuitry 220. DC power source 210 has an alternating current (AC) voltage supply 215, a full bridge rectifier (diodes D1, D2, D3, and D4), and a source capacitor C1. Source capacitor C1 may be polarized, so as to maintain a substantially DC (i.e., constant) voltage level between its positive terminal (i.e., positive rail) and negative terminal (also referred to as negative rail, common, or ground). Those skilled in the art will appreciate that other types of power sources that supply a substantially constant voltage level and current source for use as a DC power source alternatively could be substituted, e.g., using half-bridge rectifiers or DC voltage supplies, such as batteries.

Control circuitry 220 includes a main phase winding L1 and an auxiliary phase winding L2, both having terminals electrically connected to the positive rail of DC power source 210. The negative terminal of main phase winding L1 is electrically connected to the collector terminal of a transistor switch Q1 and to the anode terminal of a diode D5. The positive terminal of auxiliary phase winding L2 is electrically connected to a positive terminal of an auxiliary capacitor C2 and to the cathode terminal of diode D5. In this context, current enters a phase winding through its positive terminal and exits the phase winding through its negative terminal. Auxiliary capacitor C2 may be a polarized capacitor having the same polarity as source capacitor C1. The negative terminal of auxiliary capacitor C2 is electrically connected to the negative terminal of source capacitor C1.

Although phase windings L1 and L2 may be spatially separated from control circuitry 220, and in some cases may be considered to form part of the SRM motor rather than part of its control circuitry, these windings are illustrated in control circuitry 220 for purposes of discussion. In some implementations, main phase winding L1 may be used to generate the majority of torque in SRM 100 and, accordingly, may have a larger amount of copper (or other electrical conductor) and/or a greater number of turns than auxiliary phase winding L2.

When current flows through main phase winding L1, a first phase of the two-phase SRM is activated. The second phase is activated when current flows through auxiliary phase winding L2. When current flows through either of phase windings L1 or L2, thus energizing the winding, the resultant magnetic energy produces a positive or negative torque in the SRM, depending on the position of rotor 120 with respect to the energized winding. For instance, if rotor poles 125 are rotating toward the energized winding's stator poles, the change in inductance at the stator poles is positive, thus producing a positive motoring torque that is output by the SRM. On the other hand, if rotor poles 125 are moving away from the energized winding's stator poles, the inductance slope is negative and a negative, regenerative torque is produced that sends energy back to DC source capacitor C1 or C2.

In operation, transistor switch Q1 directs current through either main phase winding L1 or auxiliary phase winding L2 and, as such, selects a desired phase activation for the SRM. As shown in this exemplary embodiment, the transistor switch is implemented with an NPN bipolar junction transistor whose emitter terminal is electrically connected to the common (ground) potential and whose collector terminal is connected to main phase winding L1 and diode D5. Transistor switch Q1 is turned ON and OFF by a control signal 230 applied to its base terminal. Additional control circuitry (not shown), such as a microprocessor, a digital signal processor, an application specific integrated circuit, a field programmable gate array, etc., supplies the control signal.

When transistor switch Q1 is turned ON, the DC voltage from source capacitor C1 is applied across main phase winding L1 and transistor switch Q1, causing current to flow through main phase winding L1 and transistor switch Q1. The voltage drop across the conducting transistor switch Q1 is typically negligible compared with the DC source voltage level. While transistor switch Q1 is turned ON, any current in auxiliary phase winding L2 will rapidly decay because auxiliary capacitor C2 discharges to DC voltage source capacitor C1, thus causing the voltage at auxiliary capacitor C2 to eventually equal the voltage at source capacitor C1, resulting in zero voltage across auxiliary phase winding L2. Auxiliary capacitor C2 may have a relatively small capacitance compared with DC source capacitance C1 to ensure that it can quickly discharge to DC power source 210 and attain the DC source voltage level.

When the current through main phase winding L1 exceeds a predetermined level, or some other criteria is satisfied, control signal 230 applied to transistor switch Q1 may be adjusted to turn OFF transistor switch Q1. In this case, the current through main phase winding L1 is redirected through diode D5, which becomes forward biased when transistor switch Q1 stops conducting. The redirected current quickly charges auxiliary capacitor C2 above its residual voltage, which is equal to the DC source voltage, until the auxiliary capacitor voltage exceeds the DC source voltage and causes current to flow through auxiliary phase winding L2.

When transistor switch Q1 is turned OFF, there may exist situations where auxiliary capacitor C2 generates a current in auxiliary phase winding L2 before current has finished flowing in main phase winding L1. The current through auxiliary phase winding L2 is predominantly determined by the voltage of auxiliary capacitor C2 and its effect on the current flow through phase windings L1 and L2. In such a situation, simultaneous current flow through the main and auxiliary phase windings may reduce the net torque produced by the SRM, because auxiliary phase winding L2 may produce a negative torque at the same time that main phase winding L1 generates a positive torque (or vice versa). Thus, when transistor switch Q1 changes states from ON to OFF, there exists the possibility of a net torque loss (or switching loss) in the SRM due to simultaneous current flows in main phase L1 and auxiliary phase L2 windings.

This reduction in net torque production can become particularly apparent when transistor switch Q1 is repeatedly turned ON and OFF in accordance with a pulse-width modulation (PWM) control strategy. Specifically, transistor switch Q1 typically receives a PWM control signal 230 that periodically turns transistor switch Q1 ON and OFF throughout the entire duration of the main phase conduction period. In this context, the main phase conduction period is the period in which rotor poles 125 are rotating towards main phase winding L1 so that the change in inductance at the main phase winding is positive. Accordingly, if main phase winding L1 is energized at any time during the main phase conduction period, a positive torque will be produced.

More generally, the phase conduction period or dwell time associated with a given SRM phase is the time period in which the rotor poles are rotating so as to create a positive torque should current flow through that phase's associated phase winding. The dwell angle for a given SRM phase is the angular displacement of the rotor poles during that phase's dwell time. The dwell angle is usually equal to one half of the rotor-pole pitch, and the time required to traverse the dwell angle for a particular angular speed is the dwell time.

PWM control signal 230 comprises a pulse train that periodically turns ON and OFF transistor switch Q1 throughout the duration of the main phase conduction period. The pulse width of each pulse in PWM control signal 230 establishes the amount of time transistor switch Q1 is turned ON and, thus, the amount of time a positive torque is generated by main phase winding L1. By selecting the PWM control signal 230 frequency and its pulse width (or duty cycle), the amount of positive torque produced by main phase winding L1 can be controlled. However, the net positive torque produced by main phase winding L1 may be reduced because of negative torque that is simultaneously produced in auxiliary phase winding L2 every time PWM control signal 230 switches transistor switch Q1 from ON to OFF during the main phase conduction period. To illustrate this effect, FIGS. 3A-F illustrate the undesired reduction in net positive torque production that can result when using a related art PWM control strategy.

FIG. 3A illustrates a related art timing diagram of the main-phase inductance $L_m$ as a function of rotor-pole position. Inductance $L_m$ is minimized when the rotor poles are most unaligned with main phase winding L1 (e.g., FIG. 1B) and main-phase inductance $L_m$ increases to its maximum value when the rotor poles are completely aligned with main phase winding L1 (e.g., FIG. 1A). The portion of the timing diagram in which the main phase inductance $L_m$ increases in value corresponds to the main phase conduction period, at which time any current flow through main phase winding L1 will generate a positive torque in the SRM.

For simplicity, FIG. 3A and similar timing diagrams described hereinafter illustrate a linear change of inductance as a function of rotor position. However, those skilled in the art will understand that the change in main-phase inductance $L_m$ may be a more complicated function of the rotor position, rotor speed, and other parameters. Also, although FIG. 3A illustrates only one period of the timing diagram, e.g., showing the main-phase inductance $L_m$ changing from a minimum value to a maximum value back to the minimum value, those skilled in the art will understand that the illustrated timing diagram may be periodic as the rotor turns. In general, the change in main phase inductance $L_m$ is typically periodic as the rotor poles rotate at a given angular speed between their unaligned and aligned positions.

FIG. 3B illustrates a related art timing diagram of the main phase current $i_m$ that is conducted through main phase winding L1 as a result of PWM control signal 230. PWM control signal 230 repeatedly turns ON and OFF transistor switch Q1 throughout the entire main phase conduction period. And FIG. 3B also illustrates the main phase current ripple caused by the toggling of transistor switch Q1. FIG. 3D illustrates a related art timing diagram of the total amount of positive torque $T_{em}$ generated as a result of main phase current $i_m$ flowing through main phase winding L1 during the main phase conduction period.

Because main phase current $i_m$ is commutated (i.e., transferred) from main phase winding L1 to auxiliary phase winding L2 every time transistor switch Q1 is switched from ON to OFF, an auxiliary phase current also may be generated during the main phase conduction period. FIG. 3C illustrates a related art timing diagram of an auxiliary phase current $i_a$ flowing through auxiliary phase winding L2 during the main phase conduction period. Like the main phase current ripple shown in FIG. 3B, a similar auxiliary phase current ripple may result from the switching of transistor switch Q1 by PWM control signal 230.

FIG. 3E illustrates a related art timing diagram of the auxiliary phase torque $T_{ea}$ generated by auxiliary-phase current $i_a$. As rotor poles 125 rotate towards main phase winding L1, the resultant increase in main phase inductance $L_m$ corresponds to a decrease in the inductance of auxiliary phase winding L2. That is, while the rotor poles are rotating towards main phase winding L1 (i.e., increasing the main phase inductance), the rotor poles are rotating away from auxiliary phase winding L2 (i.e., decreasing the auxiliary phase inductance). Consequently, main phase current $i_m$ (FIG. 3B) generates a positive torque (FIG. 3D), whereas the auxiliary phase current $i_a$ (FIG. 3C) generates a negative torque (FIG. 3E) during the main phase conduction period. Auxiliary phase current $i_a$ also may generate a positive torque at the end of the main phase conduction period, if auxiliary phase current $i_a$ continues flowing through auxiliary phase winding L2 as rotor poles 125 begin moving away from main phase winding L1 and towards auxiliary phase winding L2.

FIG. 3F illustrates a related art timing diagram of the net torque $T_{ec}$ generated by the SRM during the main phase conduction period. The net torque is the sum of the torques generated by main phase winding L1 and auxiliary phase winding L2. Thus, the net positive torque $T_{ec}$ produced by the SRM is essentially equal to the positive torque $T_{em}$ produced by main phase winding L1 reduced by the negative torque $T_{ea}$ simultaneously produced by auxiliary phase winding L2. To maximize the net positive torque in the SRM, it is desirable to minimize the amount of negative torque $T_{ea}$ produced by auxiliary phase winding L2 during the main phase conduction period.

Related art PWM control strategies not only suffer the disadvantage of decreased net positive torque production, but also may exhibit unwanted acoustic noise. Specifically, when main phase winding L1 is producing a positive torque and auxiliary phase winding L2 is simultaneously producing a negative torque (e.g., prior art FIGS. 3A-F), the SRM may experience high audible noise apart from its switching losses. This undesired acoustic noise can significantly decrease the commercial attractiveness of single-switch control circuits for use in many SRM-based consumer products, such as household appliances and hand-held power tools.

All reference material cited herein is hereby incorporated into this disclosure by reference.

SUMMARY OF THE INVENTION

According to an aspect of the present invention, an improved single-switch control strategy is used to maximize torque production in a multi-phase SRM having an actively controlled first phase and a second phase responsive to control of the first phase. Unlike related art PWM control techniques that periodically activate the first phase for the entire duration of the first phase conduction period, the control strategy continuously activates the first phase for only a portion of the first phase conduction period. For example, the first phase may be activated at some time after the first phase conduction period begins and remains continuously activated until it is deactivated. The second phase is only activated once during the first phase conduction period, i.e., in response to the first phase deactivation. In this way, the control strategy reduces the number of phase commutations performed during the first phase conduction period, thereby reducing switching losses and audible noise in the SRM. In addition, appropriate timing of the first phase activation also can prevent simultaneous torques from being generated by the first and second phase windings. As a result, the net positive torque production of the SRM may be improved.

In accordance with another aspect of the invention, a single voltage or current pulse (control pulse or gating pulse) may be used to selectively activate the first phase of the multi-phase SRM. For example, the control pulse may be input to a switch that selectively activates the first phase in response to the control pulse. The control pulse may begin at a selected time offset or rotor position offset relative to the start of the first phase conduction period and may extend until approximately the end of the first phase conduction period. Accordingly, the starting position of the control pulse can be used to determine the duty cycle of the first phase activation, i.e., the fractional portion of the first phase conduction period for which the first phase is activated.

According to another aspect of the invention, the starting offset of the continuous first phase activation within the first phase conduction period can be dynamically determined (i.e., during operation of the SRM) based on a measured SRM machine parameter and a table lookup operation. For example, one or more rotor position measurements may be used to estimate the rotor speed and the estimated rotor speed may be used to determine a desired duty cycle. In a disclosed open-loop control embodiment, the desired duty cycle can be directly calculated as a function of the estimated rotor speed. Alternatively, in a disclosed closed-loop control embodiment, the desired duty cycle can be determined based on a rotor-speed error value derived from the estimated rotor speed. In either case, a table may be pre-computed for mapping combinations of rotor position and duty cycle values to corresponding control pulse offset values, i.e., defining starting and/or ending positions of the control pulse within the first phase conduction period. Thus, the measured rotor position and desired duty cycle values can be input to the table to determine, for example, the starting and/or ending control pulse position.

Yet according to a further aspect of the invention, the control strategy may determine the magnitude of current flow through a first phase winding as a function of the current flow required for related art PWM control strategies. For example, by knowing a related art PWM-based torque request, a corresponding torque request for use in the disclosed embodiments can be derived by dividing the related art torque request by the desired duty cycle. In this manner, the disclosed embodiments may generate the same average or root-mean-squared amount of torque over the first phase conduction period as generated using related art PWM control strategies.

Various modifications of these aspects are expressly contemplated. For example, in some embodiments the single control pulse may be divided into two or more shorter pulses (sub-pulses), but preferably not more than four sub-pulses. In such an embodiment, the magnitude of current used to generate each sub pulse is selected so that the average or root-mean-squared amount of torque produced by the plurality of sub-pulses during the first phase conduction period remains the same as if only a single control pulse were used. Further, the manner in which the desired duty cycle is determined in the control strategy can be based on dynamic measurements and/or predetermined values of one or more SRM machine parameters, such as rotor position, rotor speed, machine inductance, first and/or second phase currents, etc., including both instantaneous and/or average values, without limitation. While the disclosed embodiments illustrate exemplary open-loop and control-loop control implementations, other variations and modifications will be apparent to those skilled in the art practicing the invention.

To achieve aspects of the invention in whole or in part, a method is disclosed for controlling a multi-phase motor. According to this method, energization of a first phase of the motor is withheld for a non-zero period when the first phase's dwell time begins. Energization of the first phase is activated upon the expiration of the non-zero period. Energization of the first phase is deactivated for the remainder of the dwell time at a deactivation time occurring before or at the expiration of the dwell time.

To further achieve aspects of the invention in whole or in part, a controller for a multi-phase motor is disclosed. The controller includes a processor that: (1) determines the dwell time of a first phase of the motor, (2) withholds a signal for energizing the first phase of the motor for a non-zero period when the first phase's dwell time begins, (3) outputs the signal for energizing the first phase upon the expiration of the non-zero period, and (4) withdraws the signal for energizing the first phase for the remainder of the dwell time at a deactivation time occurring before or at the expiration of the dwell time. A regulator regulates the energization of the first phase in accordance with the energization signal.

To further achieve aspects of the invention in whole or in part, a power converter for a multi-phase motor is disclosed. The power converter includes a processor that: (1) determines the dwell time of a first phase of the motor, (2) withholds a signal for energizing the first phase of the motor for a non-zero period when the first phase's dwell time begins, (3) outputs the signal for energizing the first phase upon the expiration of the non-zero period, and (4) withdraws the signal for energizing the first phase for the remainder of the dwell time at a deactivation time occurring before or at the expiration of the dwell time. A regulator regulates the energization of the first phase in accordance with the energization signal. Energy stored by the first phase during its energization is applied to energizing a second phase of the motor upon the withdrawal of the energization signal.

Additional advantages of aspects of the invention will be set forth in part in the description which follows.

BRIEF DESCRIPTION OF THE DRAWINGS

Preferred embodiments of the invention will be described in the following paragraphs of the specification and may be better understood when read in conjunction with the attached drawings, in which.

DETAILED DESCRIPTION OF THE INVENTION

The disclosed embodiments of the invention exemplify principles of a control strategy capable of generating a greater net positive torque and less audible noise than would be generated using related art PWM control techniques in a single-switch-controlled multi-phase SRM. To establish a mathematical foundation for understanding the control strategy, consider the single-switch SRM control circuit 200 shown in FIG. 2. While reference will be made to single-switch control circuit 200 as a reference and for purposes of describing principles of the control strategy, those skilled in the art will understand that the disclosed control strategy is more broadly applicable to other single-switch-controlled multi-phase brushless machines, including those not explicitly described herein. For purposes of discussion, assume that the symbol $\therefore$ means "therefore," the symbol $\approx$ means "approximately equal to," the symbol $=$ means "equal to," the symbol $\propto$ means "directly proportional to," and the symbol $+$ means "added to," in all of the following text and equations.

Figure 1A:
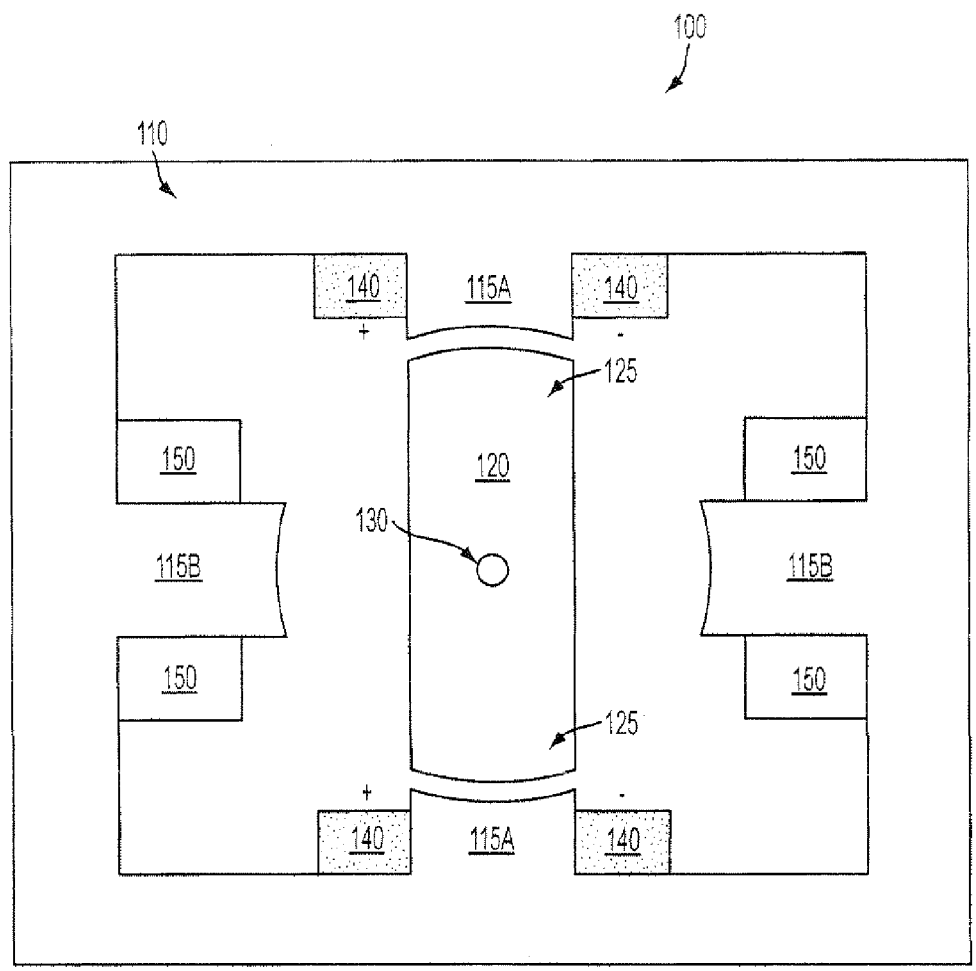
FIG. 1A illustrates a related art two-phase SRM in a first phase.
Figure 1B:
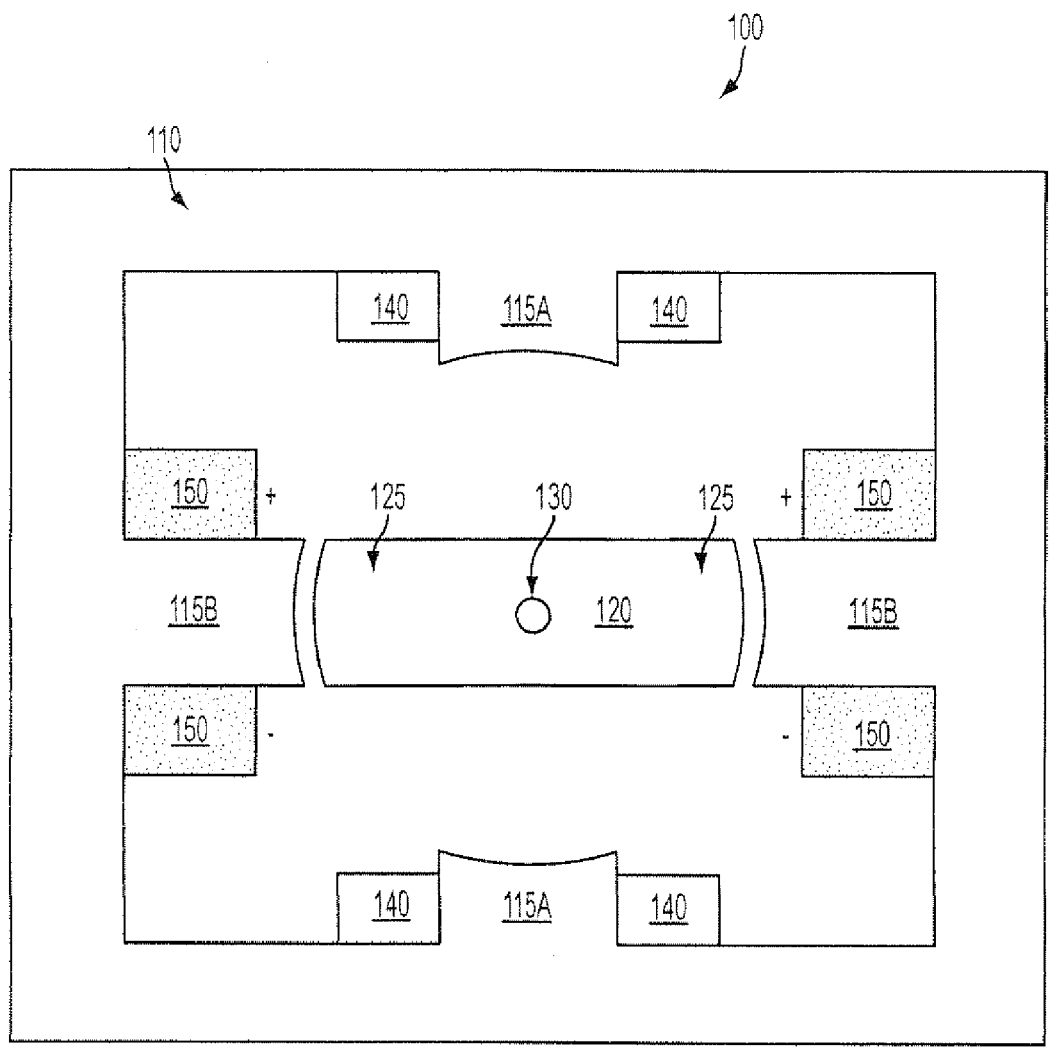
FIG. 1B illustrates a related art two-phase SRM in a second phase.
Figure 2:
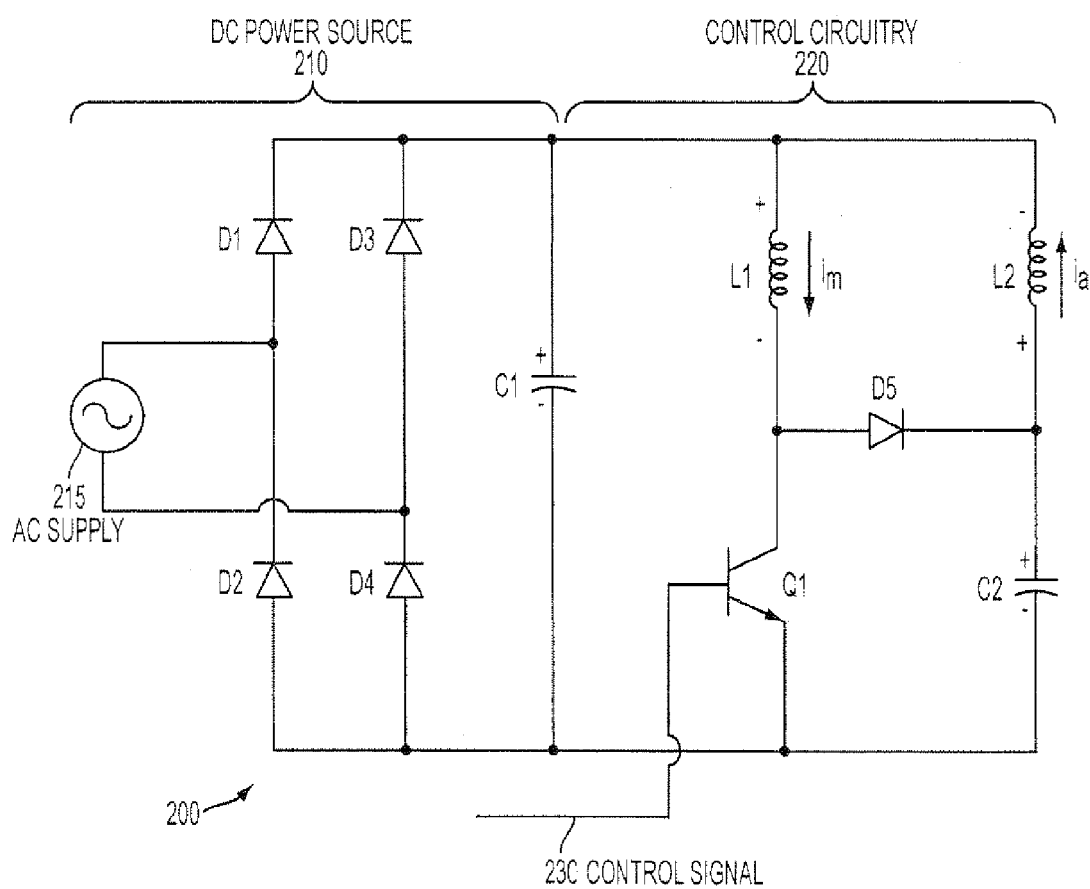
FIG. 2 illustrates a related art single-switch SRM control circuit.

Again referring to single-switch control circuit 200 in FIG. 2, the voltage $V_m$ applied to main phase winding L1 can be written mathematically as:

$$V_m = R_m i_m + L_m \frac{d i_m}{dt} + i_m \frac{d L_m}{dt} \quad (1)$$
$$= R_m i_m + L_m \frac{d i_m}{dt} + i_m \frac{d L_m}{d\theta} \frac{d\theta}{dt}$$
$$= R_m i_m + L_m \frac{d i_m}{dt} + \omega_m i_m \frac{d L_m}{d\theta}$$

where $R_m$, $L_m$, $i_m$, $V_m$, $\omega_m$, and $\theta$ are, respectively, the resistance of main phase winding L1, inductance of main phase winding L1, current through main phase winding L1, voltage across main phase winding L1, angular rotor speed, and angular rotor position. Here, all of the variables are defined in meter, kilogram, and second (MKS) units. Also, even though inductance is generally a function of main phase current and rotor position, for purposes of clarity, it is assumed that the inductance $L_m$ is a constant value for any given combination of main phase current $i_m$ and rotor position $\theta$.

If the main phase current $i_m$ is approximately constant, then the term $$L_m \frac{d i_m}{dt}$$

disappears and the voltage $V_m$ across main phase winding L1 can be rewritten, as follows:

$$V_m = R_m i_m + \omega_m i_m \frac{d L_m}{d\theta} \quad (2)$$

Further, if the resistive voltage drop $R_m i_m$ is neglected (which can be done safely except at very low speeds), the voltage $V_m$ becomes:

$$V_m \approx \omega_m i_m \frac{d L_m}{d\theta} \quad (3)$$

$$\therefore V_m \approx K_v \omega_m \quad (4)$$

where $$K_v = \left(\frac{d L_m}{d\theta} I_m\right) \quad (5)$$

and $$\therefore \omega_m \propto V_m \propto d V_{DC} \quad (6)$$

where d is the duty cycle of control signal 230 applied to transistor switch Q1 in control circuit 200 and $V_{DC}$ is the DC source voltage, e.g., maintained on source capacitor C1. Duty cycle d may be defined as the ratio between the ON time (e.g., conduction mode) of transistor switch Q1 relative to its periodic switching interval. Thus, the average voltage across main phase winding L1 for the duration of the main phase conduction period may be approximated as the product of duty cycle d and DC source voltage $V_{DC}$ applied to main phase winding L1. Because source voltage $V_{DC}$ is substantially constant, it follows from equation (6) that:

$$\therefore \omega_m \propto d \quad (7)$$

Therefore, speed control of the single-switch-controlled SRM can be achieved by varying duty cycle d. However, duty cycle d may be varied in various ways. For example, assume that T is the time duration of the main phase conduction period. When main phase current $i_m$ is applied to main phase winding L1, the resulting average input energy $\xi_m$ to main phase winding L1 can be derived as:

$$\xi_m = \int V_m i_m dt \approx d V_{DC} i_m T \quad (8)$$

Note that T and $V_{DC}$ are constant for a given system and hence equation (8) can be alternatively written in multiple forms, including:

$$\xi_m = T(dV_{DC})i_m \quad (9)$$

$$\xi_m = V_{DC}(dT)i_m \quad (10)$$

Equation (9) corresponds to a related art PWM control strategy. Specifically, the input energy is proportional to the average voltage ($d \cdot V_{DC}$) applied to main phase winding L1 for the entire duration of main phase conduction period T. As such, this related art control strategy results in pulse-width modulation of transistor switch Q1 over the fixed time period T, so as to produce an average voltage equal to $d \cdot V_{DC}$. However, as previously discussed, this related art strategy is undesirable because of its switching losses (i.e., reductions in net positive torque) and audible noise that can result when transistor switch Q1 is repeatedly switched from ON to OFF during the main phase conduction period.

Equation (10) corresponds to a single-switch control strategy in accordance with an embodiment of the invention. In this strategy, the input energy to main phase winding L1 is proportional to ($d \cdot T$) rather than $d \cdot V_{DC}$. As such, the constant voltage $V_{DC}$ may be applied for a single, continuous time interval equal to $d \cdot T$, which is less than the duration of main phase conduction period T. Furthermore, transistor switch Q1 is turned ON for only the single time interval ($d \cdot T$), thereby minimizing the number of times that switch Q1 commutates current from main phase winding L1 to auxiliary phase winding L2 during main phase conduction period T. Consequently, switching losses and audible noise due to switching of transistor switch Q1 can be reduced, i.e., because there is only one switching interval per main phase conduction period T. Moreover, as described in more detail below, by appropriately positioning switching interval $d \cdot T$ within main phase conduction period T, the net positive torque generated by the SRM can be maximized. As shown in equation (10), the control strategy can be used to input an equivalent amount of energy $\xi_m$ to main phase winding L1 (and any other phase windings in the multi-phase machine) as would be input using the related art PWM control strategy of equation (9).

Figure 4A:
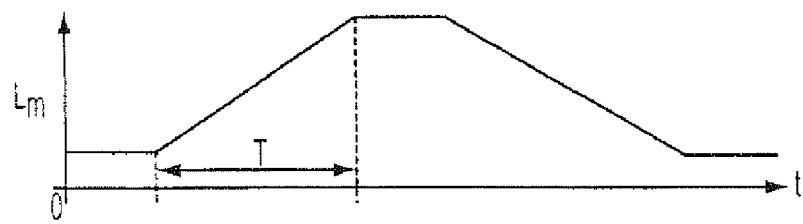
FIG. 4A illustrates a timing diagram of inductance of a main phase winding as a function of time.
Figure 4B:
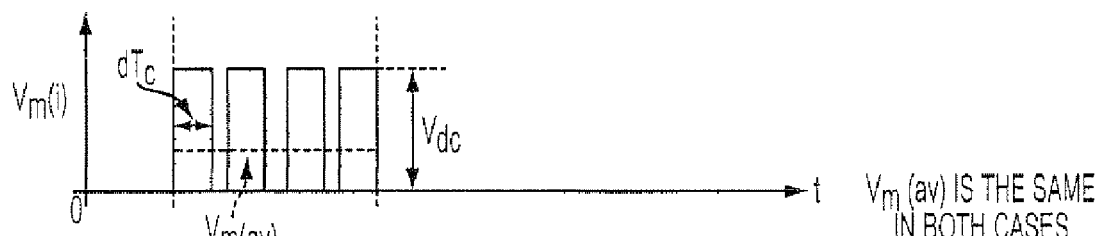
FIG. 4B illustrates a related art PWM control strategy in which voltage across a main phase winding modulates a DC source voltage for the entire duration of a main phase conduction period.
Figure 4C:
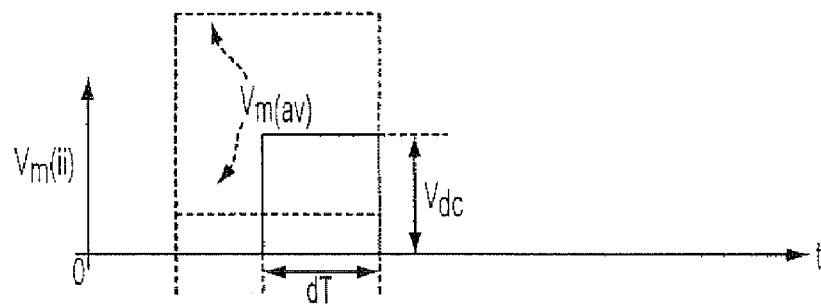
FIG. 4C illustrates a control strategy embodiment of the invention.

FIGS. 4A-C illustrate timing diagrams showing the difference between the PWM control strategy of equation (9) and the control strategy based on equation (10). FIG. 4A illustrates a timing diagram of inductance $L_m$ of main phase winding L1 as a function of time. FIG. 4B illustrates a PWM control strategy in which the voltage $V_m$ across main phase winding L1 may modulate DC source voltage $V_{DC}$ for the entire duration of main phase conduction period T. To that end, PWM control signal 230 has a period $T_c$ that is less than T, and a duty cycle d that is less than one hundred percent may be applied to transistor switch Q1 so that transistor switch Q1 is only turned ON for a duration $d \cdot T_c$ in every period $T_c$.

FIG. 4C illustrates a control strategy in accordance with an embodiment of the invention. Using this control strategy, a single control pulse of duration $d \cdot T$ is continuously applied to transistor switch Q1, thereby turning ON transistor switch Q1 for the duration of the control pulse and applying DC source voltage $V_{DC}$ across main phase winding L1. The control pulse may begin at a predetermined offset from the start of the main phase conduction period T and end at approximately the end of the main phase conduction period, i.e., where the rate of change of inductance becomes or approaches zero. The start of the control pulse may be delayed or advanced by a predetermined time offset, rotor-angle offset, or percentage relative to the start of the main phase conduction period. Additionally, in some embodiments the control pulse may end at a predetermined time offset, rotor-angle offset, or percentage relative to the end of the main phase conduction period T, such as within approximately 5% to 15% of the end of the main phase conduction period. The control strategy shown in FIG. 4C applies the same average voltage $V_{m(av)}$ to main phase winding L1 during main phase conduction period T as would be applied using the related art PWM control strategy shown in FIG. 4B.

The control strategy shown in FIG. 4C provides advantages over the related art PWM control strategy of FIG. 4B. First, because the control pulse is a single pulse in FIG. 4C, auxiliary phase winding L2 receives the commutated main phase current only one time during main phase conduction period T, and more specifically, at or near the end of main phase conduction period T, i.e., when the rotor poles are aligned with the main phase winding's stator poles. Thus, when auxiliary phase winding L2 receives the commutated main phase current $i_m$ using the control strategy shown in FIG. 4C, auxiliary phase winding L2 is already in its motoring torque producing region, and thus produces a positive torque. This is in sharp contrast to related art PWM control strategies, such as in FIG. 4B, where transistor switch Q1 commutates the main phase current repeatedly (at a frequency $1/T_c$) during main phase conduction period T and causes auxiliary phase winding L2 to produce a negative torque at the same time that main phase winding L1 produces a positive torque. Also, by eliminating the simultaneous production of positive and negative torque in the main phase and auxiliary phase windings, the control strategy in FIG. 4C reduces audible noise during operation of the SRM.

Figure 5A:
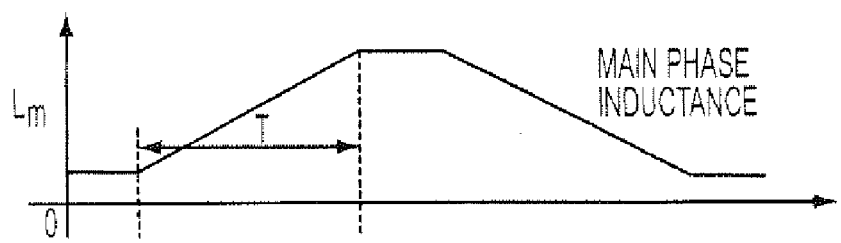
FIG. 5A illustrates a timing diagram of inductance of a main phase winding as a function of time.
Figure 5B:
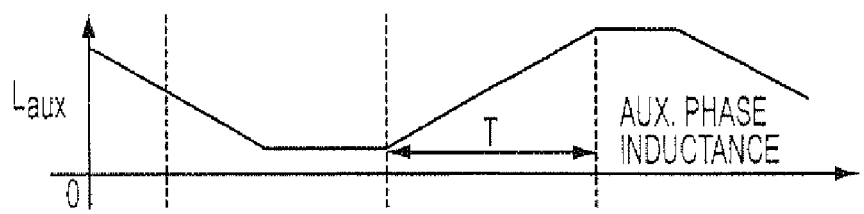
FIG. 5B illustrates a timing diagram of inductance of an auxiliary phase winding as a function of time.
Figure 5C:
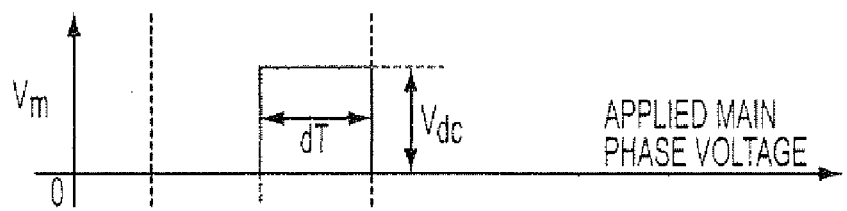
FIG. 5C illustrates a single-switch control strategy in accordance with an embodiment of the invention.

In general, selective positioning of the single control pulse in the control strategy of FIG. 4C can ensure that there is essentially no negative torque produced by either main phase winding L1 or auxiliary phase winding L2 during operation of the SRM. To illustrate this, FIGS. 5A-H illustrate timing diagrams showing SRM torque production in accordance with an embodiment of the invention. FIG. 5A illustrates a timing diagram of the inductance $L_m$ of main phase winding L1 as a function of time. FIG. 5B illustrates a timing diagram of the inductance $L_{aux}$ of auxiliary phase winding L2 as a function of time. FIG. 5C illustrates a single-switch control strategy in accordance with the disclosed embodiment. Specifically, a single control pulse of duration ($d \cdot T$) is used to turn ON transistor switch Q1 and apply DC source voltage $V_{DC}$ to main phase winding L1.

Figure 5D:
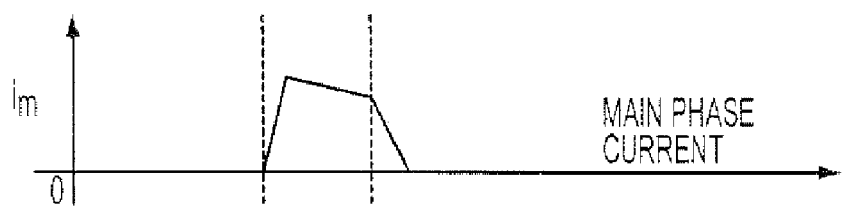
FIG. 5D illustrates a timing diagram of main phase current that is generated when a switch is turned from OFF to ON by the control pulse shown in FIG. 5C.
Figure 5E:
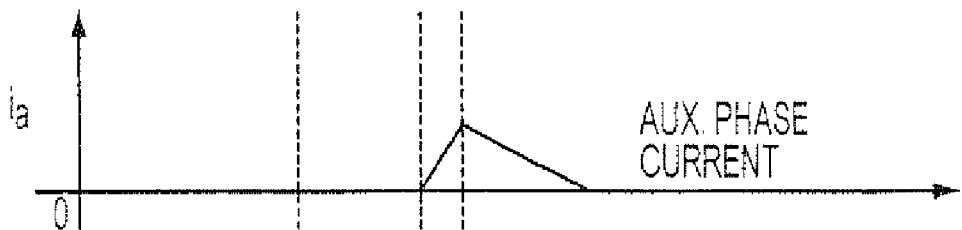
FIG. 5E illustrates a timing diagram of auxiliary phase current that is generated when a switch is turned from ON to OFF by the control pulse shown in FIG. 5C.

FIG. 5D illustrates a timing diagram of a main phase current $i_m$ that is generated when transistor switch Q1 is turned from OFF to ON by the control pulse shown in FIG. 5C. Similarly, FIG. 5E illustrates a timing diagram of an auxiliary phase current $i_a$ that is generated when transistor switch Q1 is turned from ON to OFF by the control pulse shown in FIG. 5C. As shown, when transistor switch Q1 is turned OFF, the current flowing through main phase winding L1 is commutated to auxiliary phase winding L2. Although currents $i_m$ and $i_a$ usually have an exponential growth or decay profile, for the purpose of illustration these currents are approximated by straight lines in FIGS. 5D and 5E. This linear approximation does not change the fundamental results of the control strategy.

Figure 5F:
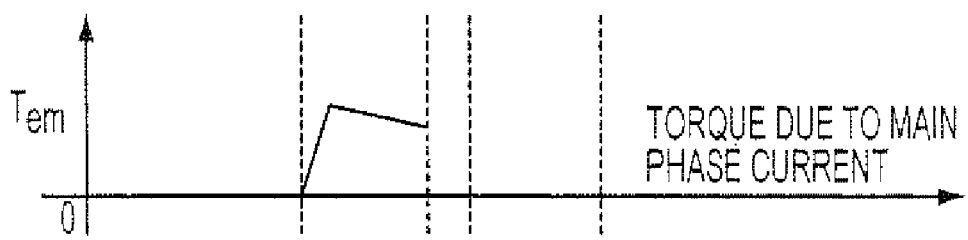
FIG. 5F illustrates a timing diagram showing electromagnetic torque produced by a main phase winding due to main phase current.
Figure 5G:
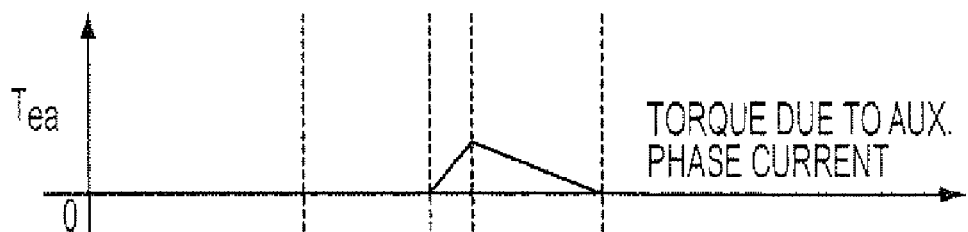
FIG. 5G illustrates a timing diagram showing electromagnetic torque produced by an auxiliary phase winding due to auxiliary phase current.

FIG. 5F illustrates a timing diagram showing the electromagnetic torque $T_{em}$ produced by main phase winding L1 due to main phase current $i_m$. Because main phase current $i_m$ is generated during main phase conduction period T, when the inductance of main phase winding L1 is increasing due to changing rotor position, torque $T_{em}$ produced by main phase winding L1 is positive. FIG. 5G illustrates a timing diagram showing the electromagnetic torque $T_{ea}$ produced by auxiliary phase winding L2 due to auxiliary phase current $i_a$. Unlike related art PWM control techniques, auxiliary phase current $i_a$ is generated during the auxiliary phase conduction period, when the inductance of auxiliary phase winding L2 is increasing due to changing rotor position, and thus torque $T_{ea}$ produced by auxiliary phase winding is positive.

Figure 3A:
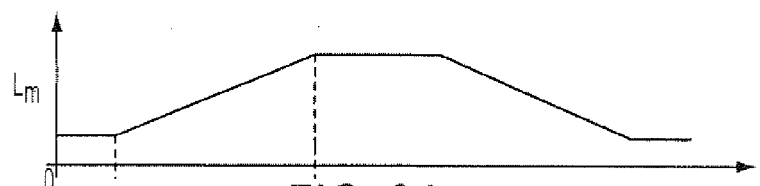
FIG. 3A illustrates a related art timing diagram of main-phase inductance as a function of rotor-pole position.
Figure 3B:
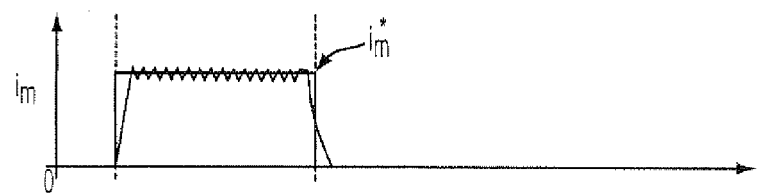
FIG. 3B illustrates a related art timing diagram of main phase current that is conducted through a main phase winding as a result of a PWM control signal.
Figure 3C:
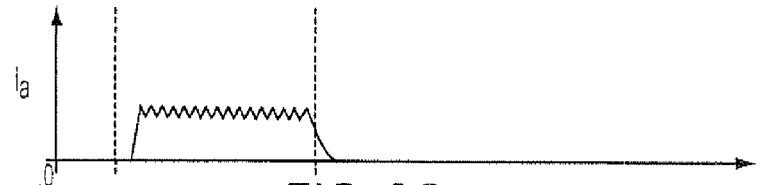
FIG. 3C illustrates a related art timing diagram of auxiliary phase current flowing through an auxiliary phase winding during a main phase conduction period.
Figure 3D:
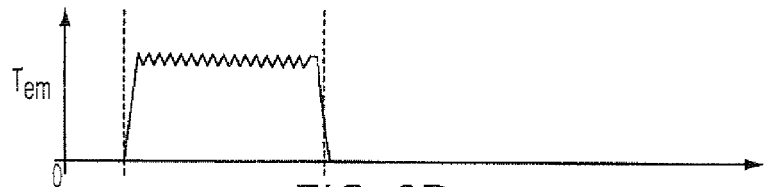
FIG. 3D illustrates a related art timing diagram of total positive torque generated as a result of a main phase current flowing through a main phase winding during a main phase conduction period.
Figure 3E:
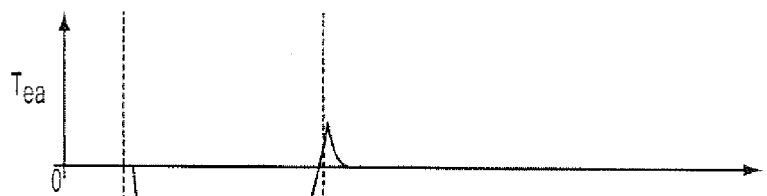
FIG. 3E illustrates a related art timing diagram of auxiliary phase torque generated by an auxiliary-phase current.
Figure 3F:
FIG. 3F illustrates a related art timing diagram of net torque generated by an SRM during a main phase conduction period.
Figure 5H:
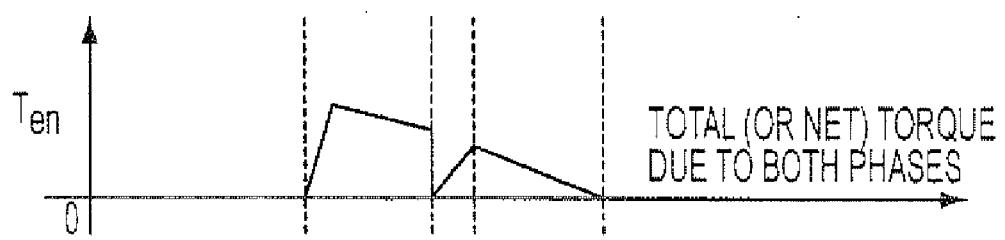
FIG. 5H illustrates a timing diagram showing total (or net) electromagnetic torque produced by a main phase winding and an auxiliary phase winding.

FIG. 5H illustrates a timing diagram showing the total (or net) electromagnetic torque $T_{en}$ produced by the main and auxiliary phase windings. The net torque produced is the sum of main phase and auxiliary phase torques $T_{em}$ and $T_{ea}$. Since both these torques are positive, net torque $T_{en}$ produced in the SRM is also positive. By way of comparison, FIGS. 3D and 3E illustrate that torques $T_{em}$ and $T_{ea}$ are typically opposite in polarity when using a related art PWM control strategy. The control strategy of FIGS. 5A-H is also different in that its main phase and auxiliary phase torques $T_{em}$ and $T_{ea}$ consist of only one torque pulse during main phase conduction period T, whereas a much larger number of discrete torque pulses are produced (e.g., one every $T_c$) using the related art PWM control strategy. As a result, the related art PWM control strategy may experience less torque ripple over main phase conduction period T. The different amounts of torque ripple between these different control strategies may be of no consequence for SRM applications that are less sensitive to torque ripple, such as in consumer and home appliances and hand tools.

Figure 6A:
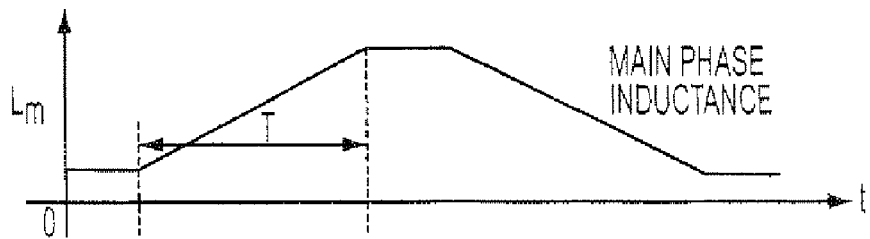
FIG. 6A illustrates a timing diagram of inductance of a main phase winding as a function of time.
Figure 6B:
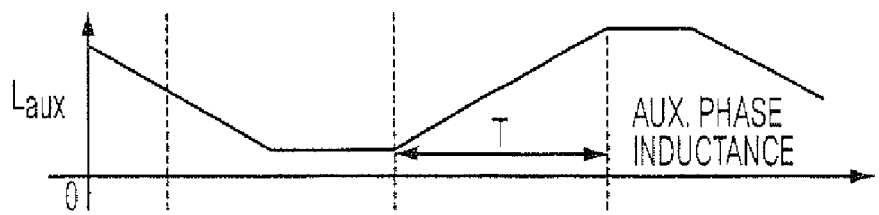
FIG. 6B illustrates a timing diagram of inductance of an auxiliary phase winding as a function of time.
Figure 6C:
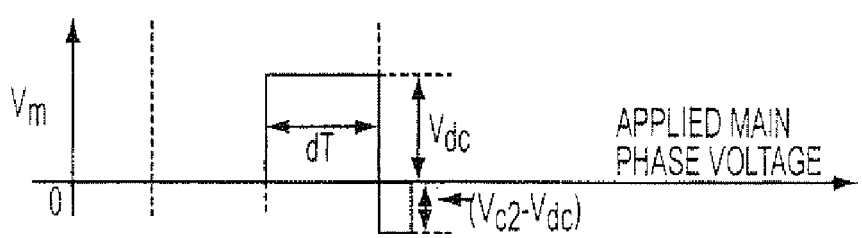
FIG. 6C illustrates a single-switch control strategy in accordance with another embodiment of the invention.
Figure 6D:
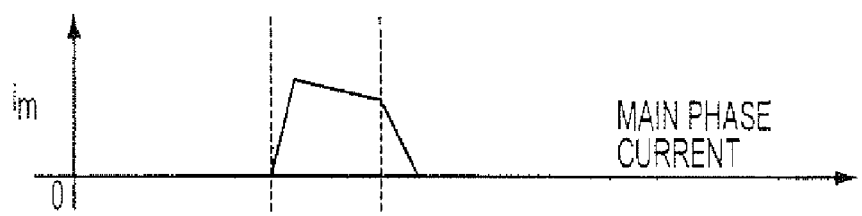
FIG. 6D illustrates a timing diagram of main phase current that is generated when a switch is turned from OFF to ON by the control pulse shown in FIG. 6C.
Figure 6E:
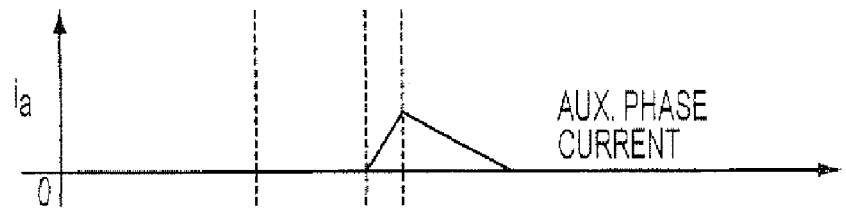
FIG. 6E illustrates a timing diagram of auxiliary phase current that is generated when a switch is turned from ON to OFF by the control pulse shown in FIG. 6C.
Figure 6F:
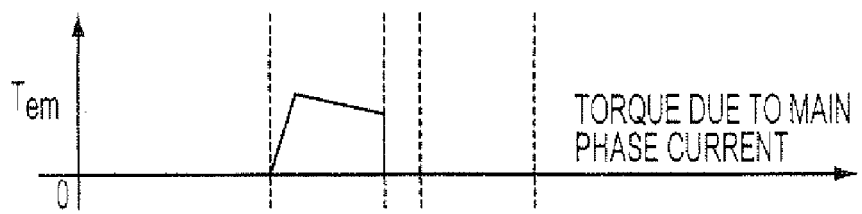
FIG. 6F illustrates a timing diagram showing electromagnetic torque produced by a main phase winding due to a main phase current.
Figure 6G:
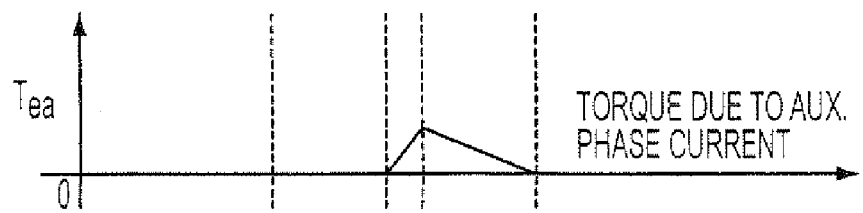
FIG. 6G illustrates a timing diagram showing electromagnetic torque produced by an auxiliary phase winding due to an auxiliary phase current.
Figure 6H:
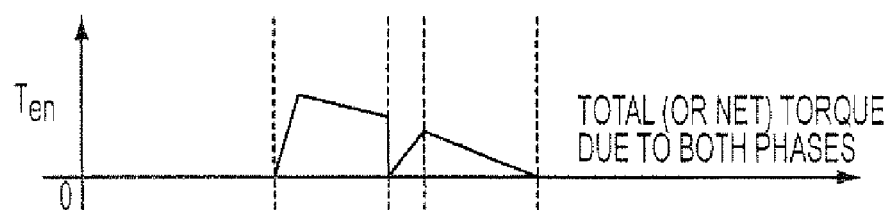
FIG. 6H illustrates a timing diagram showing total (or net) electromagnetic torque produced by a main phase winding and an auxiliary phase winding.

FIGS. 6A-H illustrate a set of timing diagrams showing SRM torque production in accordance with another embodiment of the invention. The timing diagrams of FIGS. 6A-H are substantially the same as those shown in FIGS. 5A H with one notable exception—namely, the voltage $V_m$ across main phase winding L1 has a positive pulse of voltage $V_{DC}$ followed by a short negative pulse of voltage ($V_{C2}$–$V_{DC}$), where $V_{C2}$ is the voltage across auxiliary capacitor C2 (FIG. 6C). The negative voltage pulse occurs when transistor switch Q1 is turned from ON to OFF, because main phase current $i_m$ is initially commutated to auxiliary capacitor C2, which, in turn, may charge to a voltage level greater than DC source voltage level $V_{DC}$. Then, as auxiliary capacitor C2 discharges through auxiliary phase winding L2, voltage $V_m$ across main phase winding L1 tends toward zero. Notably, the capacitance of auxiliary capacitor C2 is relatively small compared with source capacitance C1, and, as a consequence, it can be charged and discharged rapidly. The short negative voltage pulse ($V_{C2}$–$V_{DC}$) in this embodiment may slightly reduce the average voltage $V_m$ applied to main phase winding L1 during main phase conduction period T.

Duty cycle d can be determined in terms of a PWM torque request. In this context, a torque request corresponds to a desired amount of torque to be produced by the phase windings of the SRM. The torque request may be generated and/or processed by control and/or logic circuitry (not shown in FIG. 2), such as a general purpose or special purpose microprocessor, a digital signal processor, an application specific integrated circuit, a field programmable gate array, and other processing and logic elements. Based on the torque request, the control and/or logic circuitry (not shown) may generate and/or apply control signal 230 for turning ON and OFF transistor switch Q1 so as to generate the desired amount of torque.

Consider a torque request $T_{ec}$ that may be used in accordance with a related art PWM control strategy. The torque request $T_{ec}$ corresponds to a desired amount of electromagnetic torque that should be generated by main phase and auxiliary phase windings L1 and L2 in the SRM. The requested electromagnetic torque is typically matched with a desired amount of mechanical load torque $T_l$ in the SRM machine. For instance, assuming a traditional fan or pump type of load, the load torque $T_l$ may be described by:

$$T_l = K_f \omega_m^2 \tag{11}$$

where $K_f$ is a machine-dependent parameter and $\omega_m$ is the angular speed of the rotor. More generally, the control strategy can be used in various types of SRM applications, including: (i) fan or pump applications having a $T_l \propto \omega_m^2$ characteristic and relatively low (or negligible) starting torque and (ii) steady-state SRM operations, i.e., after transients have settled.

The SRM machine must generate enough electromagnetic torque to overcome its mechanical load torque. As noted, the electromagnetic torque generated by the SRM is discontinuous and in the form of pulses supplied by main phase and auxiliary phase windings L1 and L2. For purposes of discussion, assume that the auxiliary phase torque contribution may be substantially zero or the magnitude of the torque request $T_{ec}$ may be adjusted to include the effects of the auxiliary phase torque. Under this approximation, the relationship between the load torque $T_l$ and each constant torque pulse periodically generated by the SRM is:

$$T_l = \frac{T T_{ec}}{T_t} \tag{12}$$

$$\therefore T_{ec} = \frac{T_l T_t}{T} \tag{13}$$

where T is the main phase conduction period and $T_t$ is the time taken for the rotor to rotate one rotor pitch. Time $T_t$ can be obtained from the ratio between the rotor pole pitch angle and the rotor speed and can be equal to or greater than 2T depending on the design of the stator and rotor pole arcs and their shapes.

Substituting equation (11) into equation (13) yields:

$$T_{ec} = \frac{K_f \omega_m^2 T_t}{T} \tag{14}$$

Then, from equations (4) and (6), the angular speed $\omega_m$ can be calculated, as follows:

$$V_m = K_v \omega_m = d V_{DC} \tag{15}$$

or $$\omega_m = \frac{d V_{DC}}{K_v} \tag{16}$$

The result of substituting equation (16) into equation (14) can be used to find the mathematical relationship between duty cycle d and the related art PWM torque request $T_{ec}$:

$$T_{ec} = K_f \left( \frac{d^2 V_{DC}^2}{K_v^2} \right) \left( \frac{T_t}{T} \right) \quad (17)$$

And from equation (17), duty cycle d can be derived as:

$$d = \sqrt{\frac{T_{ec}}{K_f \left( \frac{V_{DC}^2}{K_v^2} \right) \left( \frac{T_t}{T} \right)}} \quad (18)$$

In equation (18), torque request $T_{ec}$ obtained through the load torque $T_l$, main phase conduction period T, time $T_t$ required to rotate one rotor pitch, source voltage $V_{DC}$, and constants $K_f$ and $K_v$ are all available or computable from rotor speed and machine parameters. For example, the main phase current and the rate of change of inductance with respect to angular rotor position may be average values or instantaneous values that are dynamically measured or, alternatively, obtained from one or more pre-stored tables of values.

In order to determine a desired duty cycle d for use with the control strategy in the disclosed embodiments, the related art PWM strategy based torque request $T_{ec}$ first may be determined. For example, a related art speed-control feedback loop can provide torque request $T_{ec}$. Usually, this torque request is obtained based on the difference between a rotor speed request and the actual rotor speed, and may be magnified using a proportional plus-integral controller, whereby the controller's output may be limited to prevent a request for more torque than the SRM can safely produce and to prevent any damage to the SRM's power electronic converter circuit. Such a technique for determining the torque request $T_{ec}$ is discussed, for example, in the text books R. Krishnan, "Electric Motor Drives", Prentice Hall, 2001 and R. Krishnan, "Switched Reluctance Motor Drives", CRC Press, 2001. After determining torque request $T_{ec}$, duty cycle d for the control strategy may be calculated using equation (18) above and the determined torque request $T_{ec}$.

Figure 7:
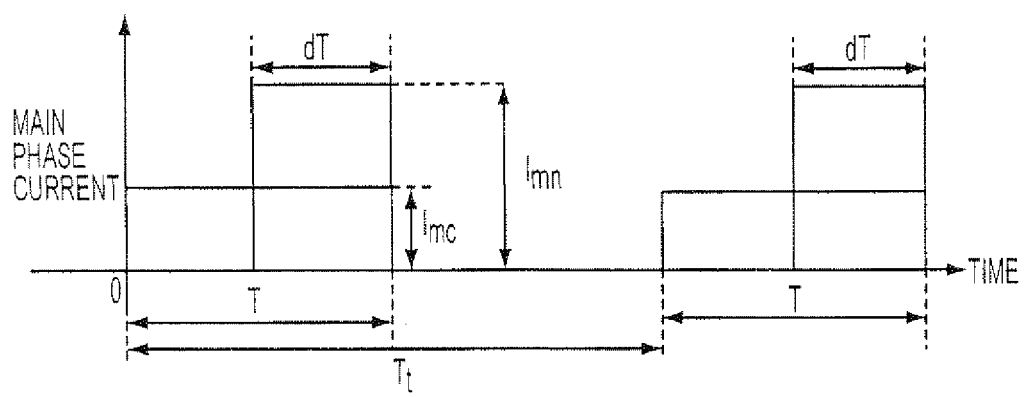
FIG. 7 illustrates a timing diagram of a relationship between a related art main phase current magnitude and a main phase current magnitude used in accordance with an embodiment of the invention.

Various other aspects of the single-switch control strategy may be understood in terms of related art PWM control strategies. For example, the magnitude of main phase current $i_{mn}$ used in the disclosed embodiments can be derived as a function of main phase current $i_{mc}$ used in related art PWM strategies. FIG. 7 illustrates a relationship between the related art main phase current magnitude $I_{mc}$ and main phase current magnitude $I_{mn}$ used in accordance with the disclosed embodiments. Here, currents are represented by lower-case "i" and their magnitudes are represented by upper-case "I." In FIG. 7, current magnitudes $I_{mc}$ and $I_{mn}$ are approximated as being constant for the durations of their respective conduction periods T and d•T.

The torque produced by main phase winding L1 is proportional to the square of main phase current magnitude $I_m$. Further, the torque generated for a given time interval is proportional to the main phase current magnitude multiplied by the amount of time that the current is applied to the main phase winding. Therefore, where the root-mean-squared or average torque generated by main phase winding L1 is the same for both the related art PWM control strategy and the control strategy of the disclosed embodiments, the following relationship can be derived:

$$I_{mc} \sqrt{\frac{T}{T_t}} = I_{mn} \sqrt{\frac{dT}{T_t}} \quad (19)$$

leading to $$I_{mn} = \frac{I_{mc}}{\sqrt{d}} \quad (20)$$

where T is the main phase conduction period, $T_t$ is the time period in which main phase conduction period T is repeated, and d is the duty cycle defining the fraction of main phase conduction period T for which a main phase current is conducted through main phase winding L1.

Accordingly, as shown in equation (20) above, the new main phase current $I_{mn}$ used with the control strategy of the disclosed exemplary embodiments can be computed as a function of the related art PWM control current request $I_{mc}$ and duty cycle d. Related art current request $I_{mc}$ may be derived based on, for example, an advanced turn-on or turn-off angle (or time) to dwell time ratio, e.g., dependent on any variations in dwell time T. For precision drive control in high-performance applications, calculations of related art main phase current $I_{mc}$ based on advanced turn-on and turn-off angles (or times) may be essential, but for many other SRM applications, such as in household and consumer appliances, automotive and hand tools, etc., such precise calculation may not be critical. For example, in these less-precise applications, the dwell time of the related art current request can be pre-programmed as a function of rotor speed or can be adaptively changed as a function of rotor speed and/or rotor speed error so as to reduce the rotor speed error during operation of the SRM.

In addition, main phase torque $T_{en}$ generated in the disclosed embodiments may be related to a related art PWM-based torque request $T_{ec}$. Here, it is assumed that the same average or root-mean-squared amount of torque is requested using both the related art PWM control strategy and the control strategy of the disclosed embodiments. According to the related art PWM control strategy, torque request $T_{ec}$ may be calculated as:

$$T_{ec} = \frac{1}{2} i^2 \frac{dL_m}{d\theta} = \frac{1}{2} I_{mc}^2 \frac{dL_m}{d\theta} \quad (21)$$

Likewise, torque request $T_{en}$ in the control strategy of the disclosed embodiments may be calculated as (using equation (12) above):

$$T_{en} = \frac{1}{2} i_{mn}^2 \frac{dL_m}{d\theta} = \frac{1}{2} \frac{I_{mc}^2}{d} \frac{dL_m}{d\theta} = \frac{T_{ec}}{d} \quad (22)$$

Therefore, by dividing related art PWM based torque request $T_{ec}$ by a desired duty cycle d (e.g., determined using equation (18)), torque request $T_{en}$ used in the control strategy of the disclosed embodiments can produce the same average or root-mean-squared amount of torque as would be produced using the related art PWM control strategy yet avoid the problems mentioned with such related art PWM control strategies. Further, because torque request $T_{en}$ generates torque for a shorter duration d•T, rather than for the full duration T of the main phase conduction period (as with related art PWM control strategies), the control strategy necessarily produces a larger amount of torque for a shorter time duration so as to produce the same average or root-mean-squared amount of torque. In mathematical terms this may be represented as:

$$\therefore (dT)T_{en} = T \cdot T_{ec} \quad (23)$$

where $T_{en}$ is the new control strategy based torque request or command and $T_{ec}$ is the related art strategy based torque request or command. For many practical applications, it can be assumed that the torque produced in the SRM machine is substantially equal to requested torque during steady state operation of the SRM.

Open Loop Control Embodiment

Figure 8:
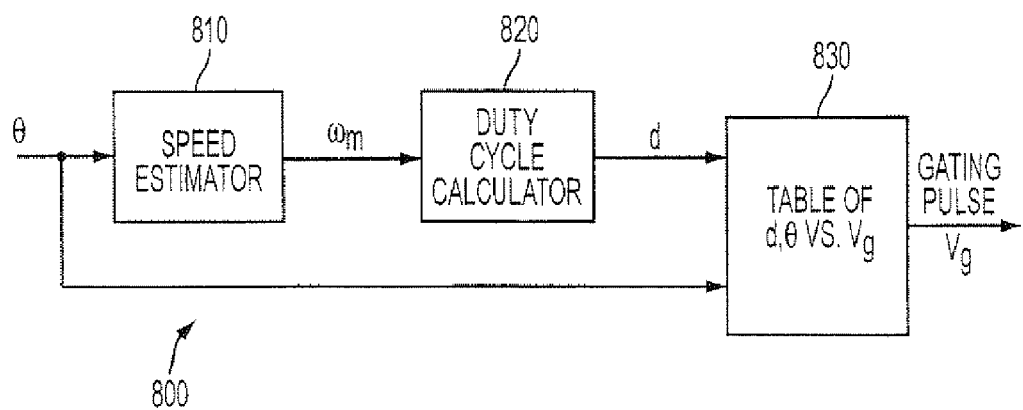
FIG. 8 illustrates an open loop control scheme for implementing a control strategy in accordance with an embodiment of the invention.

FIG. 8 illustrates an open loop control scheme for implementing the control strategy of the disclosed embodiments. The open loop system includes a speed estimator 810, a duty cycle calculator 820, and a table 830. One or more rotor position values θ may be input to speed estimator 810. The rotor position values may include one or more average or instantaneous values. The rotor position θ is absolute and can be obtained from a rotor position sensor having an index. For example, the rotor position may be measured using an optical encoder or any other type of rotor position sensor. Alternatively, the rotor position may be derived from a measurement or estimate of one or more SRM machine parameters, such as inductances, flux linkages, and/or phase-winding currents.

Speed estimator 810 receives the one or more rotor position values θ and determines an angular rotor speed $\omega_m$. In the event that the angular rotor speed has been measured directly, then speed estimator 810 may be unnecessary in open loop control scheme 800. Speed estimator 810 may be of varying complexity depending on the accuracy required in the SRM drive system. For example, in a simple implementation, speed estimator 810 may be configured to estimate angular rotor speed $\omega_m$ based on consecutive rotor position measurements (or estimations) measured within a time interval. The determined rotor speed may be an instantaneous or average value.

Angular rotor speed $\omega_m$ determined by speed estimator 810 may be input to duty cycle calculator 820. Duty cycle calculator 820 may contain processing circuitry and/or logic, such as a microprocessor or other processing element, configured to convert the angular rotor speed $\omega_m$ into a desired duty cycle for controlling transistor switch Q1 (FIG. 2). From equation (15), desired duty cycle d of the control pulse applied to transistor switch Q1 may be obtained as:

$$d = \frac{K_v \omega_m}{V_{DC}} \quad (24)$$

For some SRM applications, such as low-cost applications, duty cycle calculator 820 may employ equation (24) above to calculate duty cycle d based on angular rotor speed $\omega_m$. This simple duty-cycle calculation can reduce the possibility of computational overburden on the processing and logic elements used by duty cycle calculator 820. Thus, low-cost implementations can be realized without consuming excessive bandwidth for the control strategy of the disclosed embodiments.

While equation (24) may be sufficient for most low-cost SRM applications, further refinements of the duty cycle calculation may be necessary for applications requiring more precise speed control. For example, duty cycle d can be refined for higher accuracy by considering the voltage drop across an inherent stator resistance $R_a$. To refine duty cycle d for the stator resistance voltage, equation (24) can be modified as:

$$d = \frac{K_v \omega_m + I_m R_a}{V_{DC}} \quad (25)$$

Yet further refinement of the duty-cycle calculation may take into account the voltage drop due to inductance changes with varying main phase current. Further, to add the effect of the transistor voltage drop $V_t$, an additional term also may be included in equation (25), yielding:

$$d = \frac{K_v \omega_m + I_m R_a + V_t}{V_{DC}} \quad (26)$$

The voltage drop of the conducting transistor is not a constant, as it is a function of main phase current $i_m$. Therefore, voltage drop $V_t$ may be determined using a pre-computed table stored in a memory (not shown in FIG. 2) that may be coupled to control circuit 200. Further refinements for pn-junction temperature variations in transistor switch Q1 can be made for higher accuracy. While the duty cycle calculation may be refined for a desired accuracy, the disclosed embodiments assume that the duty-cycle calculation of equation (24) is sufficient for most consumer appliance, automotive, and hand tool applications for which single-switch control circuit 200 may be deployed.

Examples of memory elements include volatile and non-volatile memory. The memory elements may include random access memory (RAM) elements, including but not limited to static RAM and dynamic RAM. The memory elements store a pre-configured data structure, such as a table 830, that maps combinations of rotor position values θ and duty cycle values d with corresponding starting and/or ending positions of control pulses that may be applied to transistor switch Q1. As shown in FIG. 8, table 830 consists of d, θ vs. Vg, where Vg is a starting and/or ending position of the control pulse with respect to the variation of main phase inductance $L_m$ versus rotor position θ.

Figure 9A:
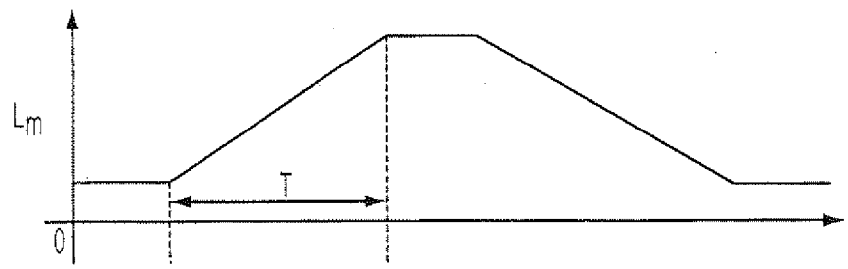
FIG. 9A illustrates a timing diagram of main phase inductance as a function of absolute rotor position.
Figure 9B:
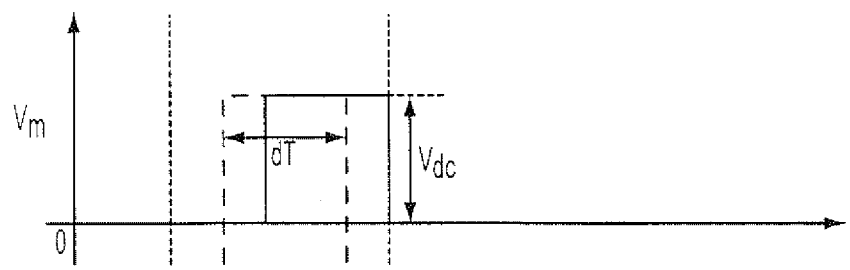
FIG. 9B illustrates a diagram of main phase voltage for two possible positions of a control pulse within the main phase conduction period shown in FIG. 9A.
Figure 9C:
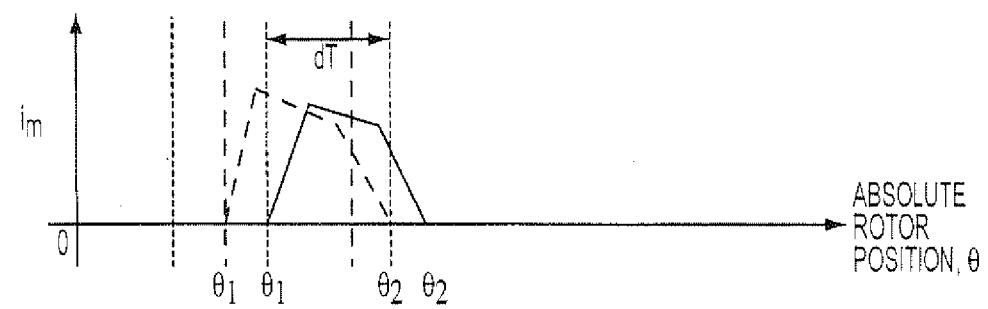
FIG. 9C illustrates a diagram of main phase current for the possible control pulse positions shown in FIG. 9B.

FIGS. 9A-C illustrate possible starting and/or ending positions of a control pulse in accordance with an embodiment of the invention. FIG. 9A illustrates a timing diagram of main phase inductance $L_m$ as a function of absolute rotor position θ. FIG. 9B illustrates a diagram of main phase voltage $V_m$ for two possible positions of the control pulse within main phase conduction period T, shown in FIG. 9A. FIG. 9C illustrates a diagram of main phase current $i_m$ for the possible control pulse positions shown in FIG. 9B. In FIGS. 9B and 9C, the starting positions of the control pulse are designated as $\theta_1$ and $\theta_{1'}$ and their corresponding ending positions are designated as $\theta_2$ and $\theta_{2'}$.

In practice, ending position $\theta_2$ of the control pulse may be positioned as close as possible to the aligned angular position of the rotor poles with the main phase winding's stator poles. However, if the ending position is placed exactly at the aligned position, in some implementations, the main phase current could spill over into the negative torque region (where the inductance slope is negative). For this reason, ending position $\theta_2$ is preferably positioned at an angle $\theta_{2'}$ that is offset by a predetermined amount from the end of the main phase conduction period, so that the main phase current cannot produce a negative torque after it has been commutated from main phase winding L1 to auxiliary phase winding L2. For example, ending position $\theta_{2'}$ may be positioned at approximately 5% to 15% of the dwell angle, or some other measure indicative of the main conduction period, from the end of main phase conduction period T to ensure that the commutated current does not produce a significant negative torque in the auxiliary phase winding. More generally, ending position $\theta_{2'}$ may be positioned at a predetermined time offset, rotor angle offset, or percentage offset from the end of the main phase conduction period.

By way of example, consider the two control pulses defined by starting and ending positions $(\theta_1, \theta_2)$ and $(\theta_{1'}, \theta_{2'})$ in FIGS. 9B and 9C. For the control pulse defined by $(\theta_1, \theta_2)$, the decaying current does not produce much positive torque because main phase current $i_m$ decreases during the flat inductance region in FIG. 9A. Furthermore, for the control pulse position defined by $(\theta_1, \theta_2)$, if the main phase current commutation becomes prolonged with respect the end of main phase conduction period T, main phase current $i_m$ may continue into the negative inductance slope region where it will produce an undesired negative torque.

On the other hand, the exemplary control pulse defined by $(\theta_{1'}, \theta_{2'})$ conducts main phase current $i_m$ entirely before the start of the negative inductance and zero-inductance slope regions shown in FIG. 9A, thus resulting in only positive torque being produced by main phase winding L1. Accordingly, table 830 preferably stores control pulse positions $V_g$ corresponding to control pulse positions $(\theta_{1'}, \theta_{2'})$, e.g., as determined from SRM motor drive simulations, for different sets of angular rotor positions $\theta$ and duty cycle values d. As such, a table lookup operation may be performed in table 830 to locate a desired control pulse position $(\theta_{1'}, \theta_{2'})$ based on the one or more angular rotor positions $\theta$ and duty cycle d output from duty cycle calculator 820. Table 830 may contain other information as well.

In some exemplary embodiments, the following equations may be used to determine control pulse positions $(\theta_1, \theta_2)$ stored in table 830 and shown in FIGS. 9B and 9C. The mathematical expressions for $\theta_1$ and $\theta_2$ may be derived starting from the following SRM machine dynamic equation:

$$V_m = R_m i_m + L_m \frac{di_m}{dt} + \omega_m i_m \frac{dL_m}{d\theta} \qquad (27)$$
$$= \left(R_m + \omega_m \frac{dL_m}{d\theta}\right) i_m + L_m \frac{di_m}{dt}$$
$$= R_{eq} i_m + L_m \frac{di_m}{dt}$$

where $$R_{eq} = \left(R_m + \omega_m \frac{dL_m}{d\theta}\right) \qquad (28)$$

During the main phase current commutation at the angular rotor position $\theta_2$, the main phase winding voltage $V_m$ may be zero (e.g., case (i) shown in FIG. 5C) or some negative value (e.g., case (ii) shown in FIG. 6C) depending on the capability of control circuit 220. For these two cases, respectively, main phase current $i_m$ may be determined as a function of time:

$$\text{Case i: } i_m(t) = I(\theta_2) e^{-t/\tau} \qquad (29)$$

$$\text{Case ii: } i_m(t) = I(\theta_2) e^{-t/\tau} - \frac{v}{R_{eq}}(1 - e^{-t/\tau}) \qquad (30)$$

where the time constant $\tau = L(\theta_2)/R_{eq}$. From equations (29) and (30), the time taken for the current to fall to zero, $t_f$, can be evaluated by substituting zero for main phase current $i_m$. Then, time $t_f$ may be converted into a corresponding angle $\theta_f$ based on the angular speed $\omega_m$:

$$\theta_f = \omega_m t_f \qquad (31)$$

Using angle $\theta_f$, it may be checked whether the current goes into a negative torque region and, if so, how much negative torque would be generated. If this angle $\theta_f$ is acceptable, then the ending position $\theta_2$ of the control pulse may be derived from FIG. 9C as, $$\theta_2 = \theta_1 + (dT)\omega_m \qquad (32)$$

so that the start of the voltage pulse angle is given by, $$\theta_1 = \theta_2 - (dT)\omega_m \qquad (33)$$

The foregoing provides a technique for deriving starting and ending angles $(\theta_1, \theta_2)$ of the duty cycled control pulse. These angles may be further offset by predetermined offsets or percentages relative to the main phase conduction period. For example, starting angle $\theta_1$ may be delayed or advanced by a predetermined offset or percentage relative to the start of main phase conduction period T. Similarly, ending angle $\theta_2$ may be delayed by a predetermined offset or percentage relative to the end of the main phase conduction period.

Other techniques for calculating angles $(\theta_1, \theta_2)$ also may be employed in accordance with the control strategy. For example, these starting and ending angular positions alternatively can be computed as a function of angular speed and duty cycle and can be stored in the form of table 830. Moreover, the technique may be performed using various types of processing and/or logic circuitry in the SRM, including devices such as general purpose and special purpose microprocessors, digital signal processors, application specific integrated circuits, field programmable gate arrays, etc.

Exemplary Closed Loop Control Embodiment

Figure 10:
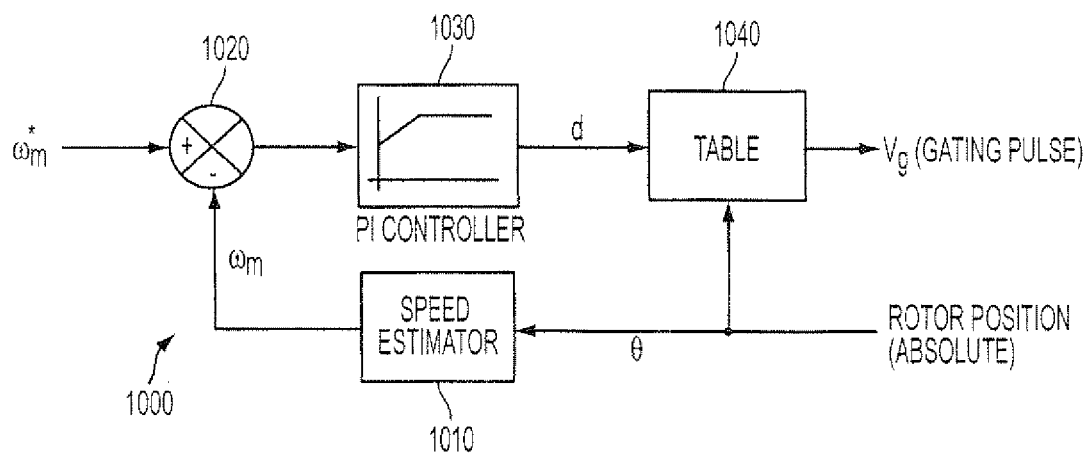
FIG. 10 illustrates a diagram of a closed loop control scheme.

FIG. 10 illustrates a schematic block diagram of a closed loop control scheme 1000 that may be used in accordance with the disclosed embodiments. This closed-loop scheme includes a speed estimator 1010, a speed error calculator 1020, a controller 1030, and a table 1040. In this control scheme, there is no duty cycle calculator and desired duty cycle d is instead obtained using feedback control of angular rotor speed $\omega_m$ and its associated speed error determination.

Like open-loop scheme 800, closed loop scheme 1000 may input one or more rotor position values $\theta$ to speed estimator 1010. The rotor position values may comprise one or more instantaneous values. The rotor position $\theta$ is absolute and can be obtained from a rotor position sensor having an index. For example, the rotor position may be measured using an optical encoder or any other type of rotor position sensor. Alternatively, the rotor position may be derived from a measurement or estimate of one or more SRM machine parameters.

Speed estimator 1010 receives the one or more rotor position values $\theta$ and determines the angular rotor speed $\omega_m$. In the event that the angular rotor speed has been measured directly, then speed estimator 1010 may be unnecessary in closed loop control scheme 1000. Speed estimator 1010 may be of varying complexity depending on the accuracy required in the SRM drive system. For example, in a simple implementation, speed estimator 1010 may be configured to estimate angular rotor speed $\omega_m$ based on consecutive rotor position measurements (or estimations) measured within a time interval. The determined rotor speed may be an instantaneous or average value.

Angular rotor speed $\omega_m$ determined by speed estimator 810 may be input to speed error calculator 1020. The speed error is generated as the difference between the speed request (command) $\omega_m^*$ and the actual rotor speed $\omega_m$ of the SRM machine rotor. The speed error is processed through a feedback controller, such as a proportional, proportional plus integral (PI), proportional plus differential (PD), or proportional plus integral plus differential (PID) controller so as to reduce the speed error to zero. As shown, controller 1030 is a PI controller. The output of controller 1030 may be normalized to coincide with a desired duty cycle d. For example, the output of the PI controller may scale with the duty cycle so that the controller's maximum output corresponds to a duty cycle equal to one and all other of its output values are made proportional accordingly.

For purposes of discussion, consider a negative speed error value in an SRM having only one-directional speed control. The negative speed error under this circumstance indicates that the duty cycle has to be reduced so that the actual speed can be reduced, thereby reducing the generated machine torque to match that of the SRM load torque. A mismatch between the machine and load torque may create excessive rotor speed and, hence, a negative speed error. Therefore, to correct excessive rotor speed, the machine torque has to be reduced by reducing the duty cycle. From this example, it can be seen that negative speed errors may correspond to a reduction in the duty cycle and positive speed errors may correspond to increases in the duty cycle for appropriate rotor speed control. In closed-loop scheme 1000, because of the action of PI controller 1030, only the positive outputs can be taken for control and the negative output can be programmed to equal zero. Therefore, in such a situation, a function generator (not shown) may be introduced between PI controller 1030 and generated duty cycle signal d.

Likewise, for a two directional SRM speed control system, a function generator (not shown) also may used to interpret the speed error values and their polarities. When the polarity of a speed request changes, the system may be requesting a change in direction of rotation. As such, control system 200 may have to prepare for the speed directional change, for example, as described in U.S. patent application Ser. No. 11/718,326, entitled "System and Method for Controlling Four Quadrant Operation of a Switched Reluctance Motor Drive Through a Single Controllable Switch," filed Apr. 30, 2007, by K. Ramu et al. From then on, the procedure is essentially same as above with suitable modifications, if necessary, as would be apparent to those skilled in the art. Open-loop control scheme 800 (FIG. 8) may be useful in low performance applications, whereas closed loop scheme 1000 (FIG. 10) may be deployed in applications requiring more robust unidirectional or bidirectional speed control.

One or more volatile and/or non-volatile memory elements in the SRM may store a pre-configured data structure, such as a table 1040, that maps combinations of rotor position values θ and duty cycle values d with corresponding starting and/or ending positions of control pulses that may be applied to transistor switch Q1. A table lookup operation may be performed in table 1040 to locate a desired control pulse position ($\theta_{1'}$, $\theta_{2'}$) based on one or more angular rotor positions θ and duty cycle d determined by the output of controller 1030. Table 1040 may contain other information as well.

As described herein, controllers 800 and 1000 illustrated by FIGS. 8 and 10 may be used to generate control signal 230 illustrated in FIG. 2. Controllers 800 and 1000 may be implemented by a hardware, software, or firmware processor.

The foregoing has been a detailed description of possible embodiments of the invention. Other embodiments of the invention will be apparent to those skilled in the art from consideration of the specification and practice of the invention disclosed herein. For example, in some embodiments the single control pulse may be divided into two or more shorter pulses (sub-pulses), but preferably not more than four sub-pulses. In such an embodiment, the magnitude of current used for each sub-pulse is selected so that the average or root-mean-squared amount of torque produced in the SRM remains the same as if only a single control pulse were used.

Figure 11A:
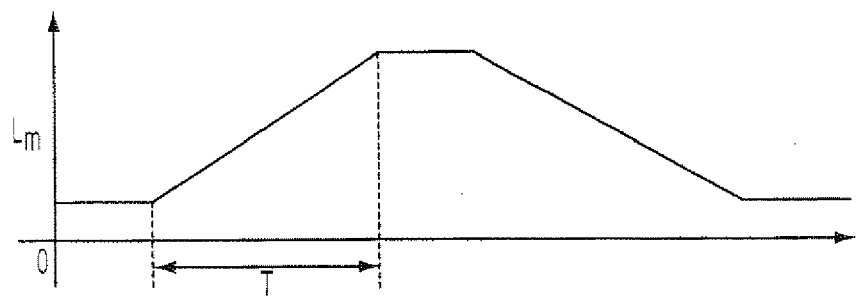
FIG. 11A illustrates a timing diagram showing main phase inductance as a function of time or rotor position.
Figure 11B:
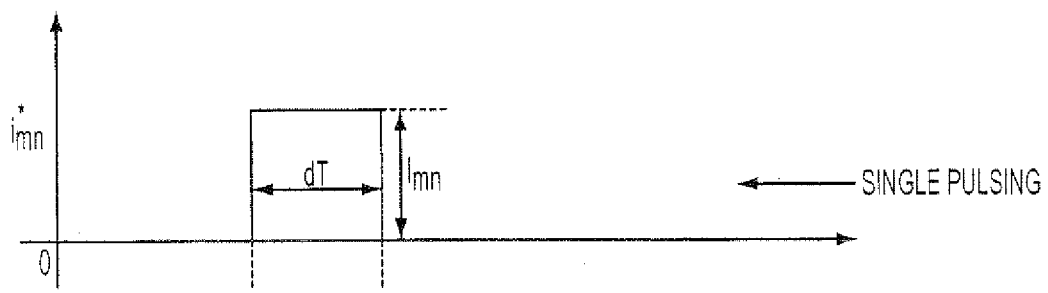
FIG. 11B illustrates a diagram of main phase current magnitude applied using a single control pulse.
Figure 11C:
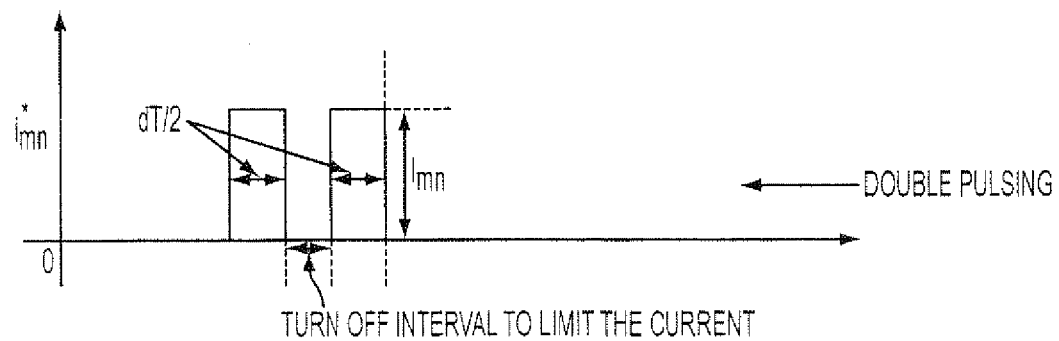
FIG. 11C illustrates a diagram of main phase current magnitude in accordance with an embodiment of the invention in which the single control pulse in FIG. 11B has been divided into two separate sub-pulses.

FIGS. 11A-C illustrate embodiments in which a single control pulse is divided into a plurality of shorter sub-pulses. FIG. 11A illustrates a timing diagram showing main phase inductance $L_m$ as a function of time or rotor position as the rotor rotates from an unaligned position with the main phase winding to an aligned position and back to an unaligned position. FIG. 11B illustrates a diagram of the main phase current magnitude applied using a single control pulse (single pulsing embodiment). FIG. 11C illustrates a diagram of the main phase current magnitude in an example in which the single control pulse in FIG. 11B has been divided into two separate sub-pulses (double pulsing embodiment). The overall area of main phase current versus time remains the same in both embodiments of FIGS. 11B and 11C, and thus the root-mean-squared main phase current value remains the same for both embodiments, as does the resulting amount of torque that they generate.

Figure 12:
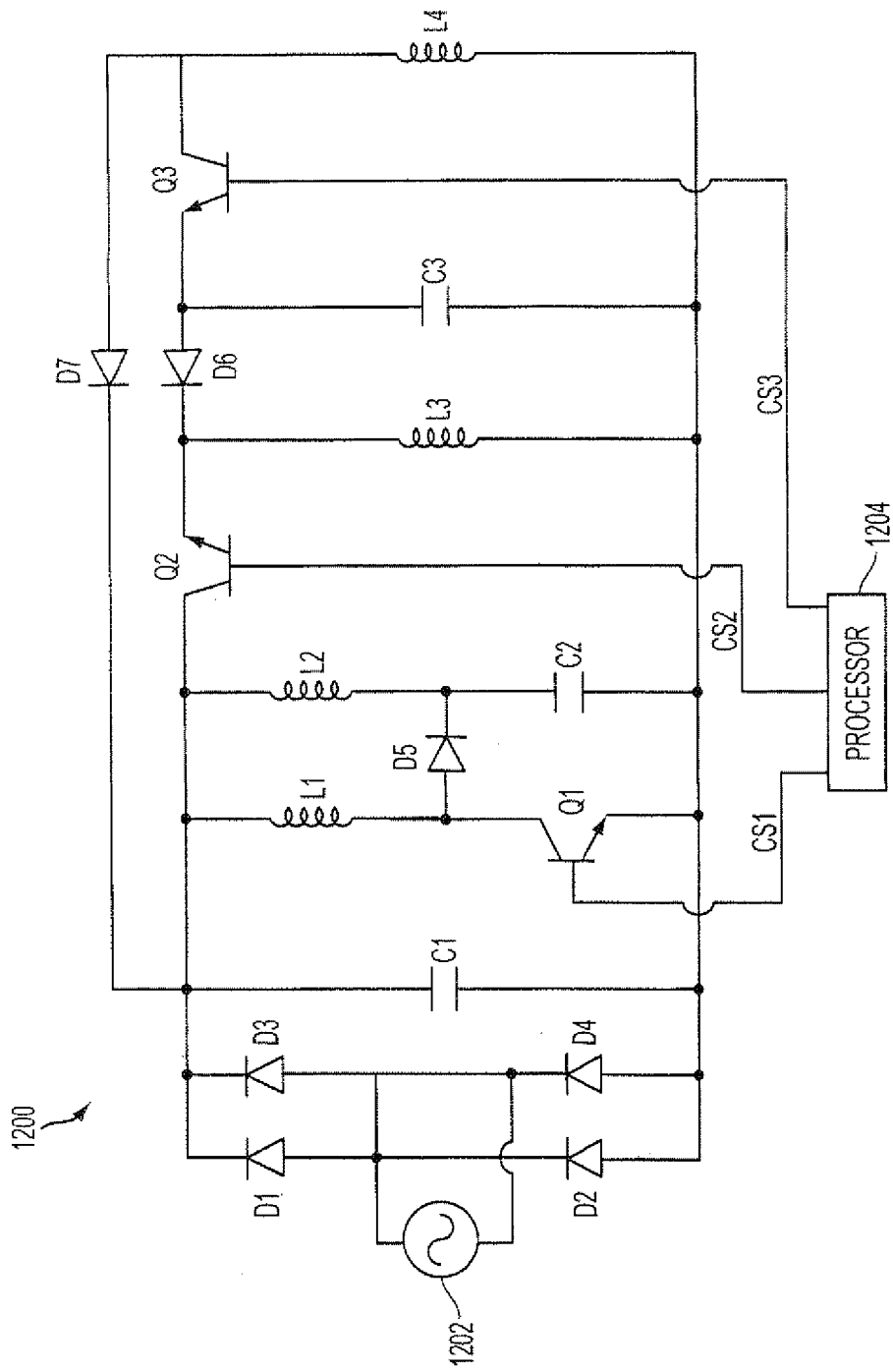
FIG. 12 illustrates a power converter for a four phase motor.

FIG. 12 illustrates a power converter 1200 for a four phase motor. Power converter 1200 includes an AC voltage supply 1202, a full bridge rectifier (diodes D1, D2, D3, and D4), and a source capacitor C1. Source capacitor C1 maintains a substantially constant DC voltage level between its positive terminal and negative terminal. A first phase winding L1 and a second phase winding L2 each have a terminal electrically connected to the positive rail of DC power source 210. The negative terminal of first phase winding L1 is electrically connected to the collector terminal of a transistor switch Q1 and to the anode terminal of a diode D5. The positive terminal of second phase winding L2 is electrically connected to a positive terminal of a capacitor C2 and to the cathode terminal of diode D5. The negative terminal of capacitor C2 is electrically connected to the negative terminal of source capacitor C1.

In operation, transistor switch Q1 directs current through either first phase winding L1 or second phase winding L2 and, as such, selects a desired phase activation for the motor. Transistor switch is implemented with an NPN bipolar junction transistor whose emitter terminal is electrically connected to ground potential and whose collector terminal is connected to first phase winding L1 and diode D5. Transistor switch Q1 is turned ON and OFF by a control signal CS1 applied to its base terminal by a processor 1204.

When transistor switch Q1 is turned ON, the DC voltage from source capacitor C1 is applied across first phase winding L1 and transistor switch Q1, causing current to flow through first phase winding L1 and transistor switch Q1. While transistor switch Q1 is turned ON, any current in second phase winding L2 will rapidly decay because capacitor C2 discharges to source capacitor C1, thus causing the voltage at capacitor C2 to eventually equal the voltage at source capacitor C1, resulting in zero voltage across second phase winding L2.

When the current through first phase winding L1 exceeds a predetermined level, or some other criteria is satisfied, control signal CS1 applied to transistor switch Q1 may be adjusted to turn OFF transistor switch Q1. In this case, the current through first phase winding L1 is redirected through diode D5, which becomes forward biased when transistor switch Q1 stops conducting. The redirected current quickly charges capacitor C2 above its residual voltage, which is equal to the DC source voltage, until capacitor C2 voltage exceeds the DC source voltage and causes current to flow through second phase winding L2.

When transistor switch Q1 is turned OFF, there may exist situations where capacitor C2 generates a current in second phase winding L2 before current has finished flowing in first phase winding L1. The current through second phase winding L2 is predominantly determined by the voltage of capacitor C2 and its effect on the current flow through phase windings L1 and L2. In such a situation, simultaneous current flow through the first and second phase windings may reduce the net torque produced by the motor, because second phase winding L2 may produce a negative torque at the same time that first phase winding L1 generates a positive torque (or vice versa). Thus, when transistor switch Q1 changes states from ON to OFF, there exists the possibility of a net torque loss (or switching loss) in the motor due to simultaneous current flows in first phase L1 and second phase L2 windings.

Power converter 1200 also includes a transistor Q2 that regulates the flow of energy from source capacitor C1 through a third phase winding L3 of the motor under the control of a control signal CS2 provided by processor 1204. Energy not used by the motor that is discharged by third phase winding L3 is stored within a capacitor C3 via a circuit completed by a diode D6. A transistor Q3 regulates the flow of energy from capacitor C3 through a fourth phase winding L4 of the motor under the control of a control signal CS3 provided by processor 1204. Energy not used by the motor that is discharged by fourth phase winding L4 is conveyed to source capacitor C1 for storage via a circuit completed by a diode D7.

In a preferred embodiment of the invention, processor 1204 regulates control signals CS1-CS3 such that phase windings L1, L3, and L4 do not passively receive energy from another discharging phase winding.

Figure 13:
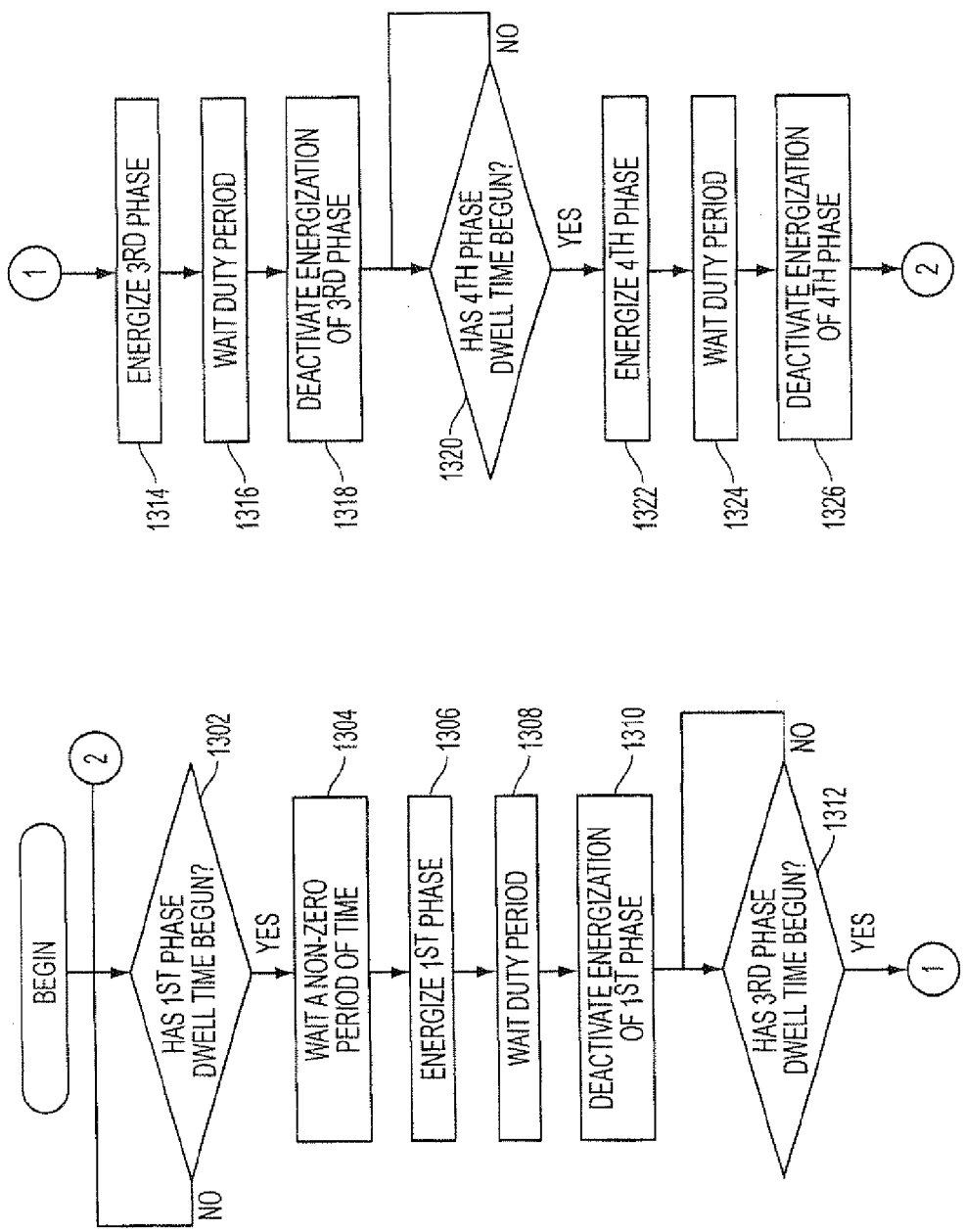
FIG. 13 illustrates a flow chart of a method for applying four-phase motoring torque to a rotating rotor of a four-phase motor using the power converter illustrated in FIG. 12.

FIG. 13 illustrates a flow chart of a method for applying four-phase motoring torque to a rotating rotor of a four-phase motor using the power converter illustrated in FIG. 12. According to this method, processor 1204 determines 1302 whether the dwell time for the first phase of the motor has begun, based on information indicative of the rotor's angular position with respect to the stator. If so, processor waits 1304 a non-zero period of time; otherwise, processor 1204 continues monitoring for the beginning of the first phase's dwell time. The non-zero period of time is determined in accordance with a torque request of torque to be applied to the motor load, a first phase energization deactivation time offset from the end of the first phase dwell time, and the number of energization pulses to be applied during the first phase dwell time. Upon the expiration of the non-zero period of time, processor 1204 energizes 1306 first phase L1 by applying control signal CS1 to transistor switch Q1. Since first phase L1 is energized during its dwell time, motoring torque is applied to the motor rotor. Upon the expiration 1308 of the activation duty period d, processor 1204 deactivates 1310 the energization of first phase L1 through control signal CS1.

Deactivation 1310 of the energization of first phase L1 causes energy stored within first phase L1 to passively energize second phase L2. Since deactivation 1310 of the energization of first phase L1 occurs at the end of first phase L1's dwell time or at a small offset before the end, all or nearly all of the energy provided by first phase L1 to second phase L2 is transferred during second phase L2's dwell time. Thus, second phase L2 generates only, or predominantly, motoring torque.

Processor 1204 determines 1312 whether the dwell time for the third phase of the motor has begun, based on information indicative of the rotor's angular position with respect to the stator. If so, processor energizes 1314 third phase L3 in accordance with a torque request for this phase by applying energization control signal CS2 to transistor switch Q2. Since third phase L3 does not, within this embodiment of the invention, passively provide energy to another motor phase, energization 1314 of third phase L3 may be executed in any manner within third phase L3's dwell time without generating negative motoring torque in another motor phase. For example, energization of third phase L3 may occur by applying a pulse width modulated signal to transistor switch Q2 over the duration of third phase L3's dwell time or in accordance with the energization scheme applied to first phase L1. Upon the expiration 1316 of the duty period of energization 1314, processor 1204 deactivates 1318 energization 1314 of third phase L3 at, or before, the expiration of third phase L3's dwell time via control signal CS2 applied to transistor switch Q2. Since energization 1314 of third phase L3 occurs only within its respective dwell time, only, or predominantly, motoring torque is generated by this energization.

Processor 1204 determines 1320 whether the dwell time for the fourth phase of the motor has begun, based on information indicative of the rotor's angular position with respect to the stator. If so, processor energizes 1322 fourth phase L4 in accordance with a torque request for this phase by applying energization control signal CS3 to transistor switch Q3. Since fourth phase L4 does not, within this embodiment of the invention, passively provide energy to another motor phase, energization 1322 of fourth phase L4 may be executed in any manner within fourth phase L4's dwell time without generating negative motoring torque in another motor phase. For example, energization of fourth phase L4 may occur by applying a pulse width modulated signal to transistor switch Q3 over the duration of fourth phase L4's dwell time or in accordance with the energization scheme applied to first phase L1. Upon the expiration 1324 of the duty period of energization 1322, processor 1204 deactivates 1326 energization 1322 of fourth phase L4 at, or before, the expiration of fourth phase L4's dwell time via control signal CS3 applied to transistor switch Q3. Since energization 1322 of fourth phase L4 occurs only within its respective dwell time, only, or predominantly, motoring torque is generated by this energization.

Operations 1302 through 1326 are repeated for every rotational cycle of the motor's rotor when motoring torque is to be applied in all four motor phases.

Other variations of the disclosed embodiments may include advanced commutation control. That is, the main phase current commutation can be advanced an appropriate amount prior to reaching the aligned inductance position to ensure that the main phase current does not to spill over into the regenerating region, so as to avoid any negative torque generation by the main phase winding. The advanced commutation angle, e.g., measured in terms of absolute rotor position, can be a function of the angular rotor speed. The control pulse also may be shaped or dimensioned as a function of the rotor speed, e.g., to provide advanced turn-on control that can maintain the rotor speed near or above its nominal speed.

More generally, the manner in which desired duty cycle d is determined can be based on dynamic measurements and/or predetermined values of various SRM machine parameters, such as rotor position, rotor speed, machine inductance, first and/or second phase currents, etc., including both instantaneous and/or average values, without limitation. While the disclosed embodiments illustrate exemplary open-loop and control-loop control implementations, other variations and modifications will be apparent to those skilled in the art.

It is expressly contemplated that at least portions of the invention can be implemented in software, including a computer readable medium having program instructions executing on a computer, firmware, hardware, or combinations thereof, as will be apparent to those skilled in the art. Those skilled in the art will understand that the teachings of the invention are consistent with other embodiments that may employ other electrical and/or mechanical components, in addition to or in place of, the particular components shown.

The foregoing description illustrates and describes the invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A method for controlling a multi-phase motor, the method comprising:
    withholding energization of a first phase of the motor for a non-zero period when the first phase's dwell time begins;
    activating the energization of the first phase upon the expiration of the non-zero period; and
    deactivating the energization of the first phase for the remainder of the dwell time at a deactivation time occurring before or at the expiration of the dwell time, wherein
    the dwell time of the first phase is the period during which the change of inductance is positive within a motor winding of the first phase.

2. The method of claim 1, wherein the energization of the first phase is activated and deactivated only once in the dwell time.

3. The method of claim 1, wherein the energization of the first phase is activated and deactivated multiple times in the dwell time.

4. The method of claim 1, further comprising applying energy stored by the first phase during its energization to energize a second phase of the motor upon deactivating the energization of the first phase.

5. The method of claim 4, further comprising:
    determining the time required for the first phase to de-energize; and
    setting the deactivation time based on the expiration of the dwell time and the determined time for de-energizing the first phase.

6. The method of claim 5, wherein the deactivation time precedes the expiration of the dwell time by no more than the determined time for de-energizing the first phase.

7. The method of claim 4, wherein the deactivation time is set to prevent the generation of negative motoring torque in the second phase due the application of energy stored in the first phase to the second phase.

8. The method of claim 7, wherein the deactivation time is set to prevent the generation of negative motoring torque in the first phase.

9. The method of claim 4, wherein the second phase is passively energized by the de-energization of the first phase.

10. The method of claim 9, wherein only the second phase is passively energized by the de-energization of another motor phase.

11. The method of claim 7, wherein:
    the second phase is passively energized by the de-energization of the first phase, and
    only the second phase is passively energized by the de-energization of another motor phase.

12. The method of claim 1, further comprising:
    determining a requested torque for rotating a load of the motor; and
    setting, based on the deactivation time, an activation time for activating the energization of the first phase so as to generate the requested torque with the first phase within the dwell time.

13. The method of claim 12, wherein the activation time is set based on the magnitude of current to be applied in energizing the first phase during the dwell time and an estimated current magnitude applied over the entire dwell time to achieve the same amount of energization.

14. The method of claim 12, further comprising:
    determining the rotational speed of a rotor of the motor, wherein
    the activation time is set based on the determined rotational speed of the rotor.

15. The method of claim 13, wherein the activation time is set based on a current to be applied in energizing phase A, the resistance of the motor's stator for phase A, and a voltage drop of a regulator that activates and de-activates the energization of phase A.

16. A controller for a multi-phase motor, the controller comprising:
    a processor that:
        determines the dwell time of a first phase of the motor,
        withholds a signal for energizing the first phase of the motor for a non-zero period when the first phase's dwell time begins,
        outputs the signal for energizing the first phase upon the expiration of the non-zero period, and
        withdraws the signal for energizing the first phase for the remainder of the dwell time at a deactivation time occurring before or at the expiration of the dwell time; and
    a regulator that regulates the energization of the first phase in accordance with the energization signal, wherein
    the dwell time of the first phase is the period during which the change of inductance is positive within a motor winding of the first phase.

17. The controller of claim 16, wherein the processor outputs and withdraws the energization signal only once in the dwell time.

18. The controller of claim 16, wherein the processor outputs and withdraws the energization signal multiple times in the dwell time.

19. The controller of claim 16, wherein the processor determines the rotational speed of a rotor of the motor and outputs the energization signal at a time based on the determined rotational speed so as to apply a desired torque to the rotor.

20. The controller of claim 16, wherein, so as to apply a desired torque to a rotor of the motor, the processor outputs the energization signal at a time based on a current to be applied in energizing phase A, the resistance of the motor's stator for phase A, and a voltage drop of a regulator that activates and de-activates the energization of phase A.

21. A power converter for a multi-phase motor, the power converter comprising:
a processor that:
determines the dwell time of a first phase of the motor,
withholds a signal for energizing the first phase of the motor for a non-zero period when the first phase's dwell time begins,
outputs the signal for energizing the first phase upon the expiration of the non-zero period, and
withdraws the signal for energizing the first phase for the remainder of the dwell time at a deactivation time occurring before or at the expiration of the dwell time; and
a regulator that regulates the energization of the first phase in accordance with the energization signal, wherein:
energy stored by the first phase during its energization is applied to energizing a second phase of the motor upon the withdrawal of the energization signal, and
the dwell time of the first phase is the period during which the change of inductance is positive within a motor winding of the first phase.

22. The power converter of claim 21, wherein the processor determines the time required for the first phase to de-energize and sets the deactivation time based on the expiration of the dwell time and the determined time for de-energizing the first phase.

23. The power converter of claim 22, wherein the processor sets the deactivation time to precede the expiration of the dwell time by no more than the determined time for de-energizing the first phase.

24. The power converter of claim 21, wherein the processor determines a requested torque for rotating a load of the motor and outputs, based on the deactivation time, the energization signal at a time so as to generate the requested torque with the first phase within the dwell time.

25. The power converter of claim 21, wherein the processor sets the deactivation time to prevent the generation of negative motoring torque in the second phase due the application of energy stored in the first phase to the second phase.

26. The power converter of claim 25 wherein the processor sets the deactivation time to prevent the generation of negative motoring torque in the first phase.

27. The power converter of claim 25, wherein:
the second phase is passively energized by the de-energization of the first phase, and
only the second phase is passively energized by the de-energization of another motor phase.

28. The power converter of claim 21, wherein the second phase is passively energized by the de-energization of the first phase.

29. The power converter of claim 28, wherein only the second phase is passively energized by the de-energization of another motor phase.

30. The power converter of claim 21, wherein the processor outputs the energization signal at a time based on the magnitude of current to be applied in energizing the first phase during the dwell time and an estimated current magnitude applied over the entire dwell time to achieve the same amount of energization.

31. The power converter of claim 21, wherein the processor determines the rotational speed of a rotor of the motor and outputs the energization signal at a time based on the determined rotational speed of the rotor so as to apply a desired torque to the rotor.

32. The power converter of claim 21, wherein, so as to apply a desired torque to a rotor of the motor, the processor outputs the energization signal at a time based on a current to be applied in energizing phase A, the resistance of the motor's stator for phase A, and a voltage drop of a regulator that activates and de-activates the energization of phase A.

* * * * *